(12) United States Patent
Ayed et al.

(10) Patent No.: US 8,045,961 B2
(45) Date of Patent: Oct. 25, 2011

(54) SYSTEMS FOR WIRELESS AUTHENTICATION BASED ON BLUETOOTH PROXIMITY

(76) Inventors: Mourad Ben Ayed, Tunis (TN);
Abderrahman Ben Ayed, Tunis (TN)

( * ) Notice: Subject to any disclaimer, the term of this patent is extended or adjusted under 35 U.S.C. 154(b) by 0 days.

(21) Appl. No.: 12/488,611

(22) Filed: Jun. 22, 2009

(65) Prior Publication Data
US 2011/0215921 A1  Sep. 8, 2011

(51) Int. Cl.
*H04M 1/66* (2006.01)
*H04B 5/00* (2006.01)

(52) U.S. Cl. ....... 455/411; 455/410; 455/41.1; 455/41.2

(58) Field of Classification Search .............. None
See application file for complete search history.

(56) References Cited

U.S. PATENT DOCUMENTS

| | | | |
|---|---|---|---|
| 5,796,338 A | 8/1998 | Mardirossian et al. | |
| 6,577,239 B2 | 6/2003 | Jespersen et al. | |
| 6,836,212 B2 | 12/2004 | Sawinski et al. | |
| 6,989,748 B2 | 1/2006 | Rabanne et al. | |
| 7,005,999 B2 | 2/2006 | Salzhauer et al. | |
| 7,054,594 B2 | 5/2006 | Bloch et al. | |
| 7,069,001 B2 | 6/2006 | Rupp et al. | |
| 7,076,238 B2 | 7/2006 | Matsumoto et al. | |
| 7,106,171 B1 | 9/2006 | Burgess et al. | |
| 7,340,215 B2 | 3/2008 | Yokoshi et al. | |
| 7,378,939 B2 | 5/2008 | Sengupta et al. | |
| 7,463,861 B2 | 12/2008 | Eisenbach et al. | |
| 7,526,295 B2 | 4/2009 | Khare et al. | |
| 2005/0280546 A1 | 12/2005 | Ganley et al. | |
| 2006/0083187 A1 | 4/2006 | Dekel et al. | |
| 2006/0128305 A1* | 6/2006 | Delalat | 455/41.2 |
| 2006/0199536 A1 | 9/2006 | Eisenbach et al. | |
| 2008/0168542 A1* | 7/2008 | Sato | 726/5 |
| 2009/0047903 A1 | 2/2009 | Eisenbach et al. | |
| 2009/0093215 A1 | 4/2009 | Eisenbach et al. | |
| 2009/0203349 A1* | 8/2009 | Hollstien | 455/404.1 |
| 2009/0249478 A1* | 10/2009 | Rosener et al. | 726/19 |

OTHER PUBLICATIONS

U.S. Appl. No. 11/204,483, filed Aug. 17, 2005, Mourad Ben Ayed.

* cited by examiner

*Primary Examiner* — Erika Gary
(74) *Attorney, Agent, or Firm* — Daniel Schein, Esq.

(57) ABSTRACT

A method and apparatus for wireless authentication, secure automatic access to application and to systems and for providing an alarm to users upon detecting that a monitored device is not within a desired proximity using a BLUETOOTH apparatus are described.

17 Claims, 11 Drawing Sheets

SYSTEM FOR WIRELESS AUTHENTCATION

SYSTEM FOR WIRELESS AUTHENTCATION

SYSTEMS FOR WIRELESS AUTHENTICATION BASED ON BLUETOOTH PROXIMITY

FIELD OF THE INVENTION

The present inventions relate to devices that allow automatic wireless authentication based on BLUETOOTH proximity and more specifically relates to devices that provide automatic login to applications and services.

BACKGROUND

Portable electronic devices such as cellular telephones, personal digital assistants (PDAs), wireless email devices, instant messaging devices, pagers, portable compact disk (CD) players, portable MP3 players, and others are often forgotten, lost, or stolen (a "PED" includes any portable device that can be used for communication, performing intellectual and/or physical work, and/or entertainment). Existing wireless device loss detection approaches focus primarily on remotely accessing a device after it is lost. This allows prohibiting the device, such as a cell phone, from placing phone calls. It also allows hiding the device owner's information or erasure of sensitive data. This strategy aims to increase the user's chances of recovering the device and to protect data stored in the device. This method does not allow users to quickly recover their lost devices.

Other methods for tracking and locating a lost cell phone include network triangulation and GPS interrogation. These methods do not allow users to automatically and/or instantaneously recover their lost devices.

The most common model for PC application login generally relies on a set of user name and password that the user enters in a login screen. Once the user name and login are authenticated, the user gains access to the application.

This model has presents a few security problems. For example:

Multiple users can login with the same username/password,

A person can steal a username and password combination without the account owner noticing. The person can login into the system undetected.

For mobile phone applications, the phone generally goes to sleep mode after one minute of user inaction, and later, the user has to login again. For frequent users of mobile applications, this process is inconvenient and wastes them a lot of time.

The current invention utilizes features of BLUETOOTH to provide secure automatic access to mobile payment, mobile banking and mobile CRM applications thus increasing usability, convenience and efficiency to users while maintaining higher security standards. This new technology also provides an alarm when the user mobile terminal is away from the device of the invention, thus preventing loss and theft of mobile terminals.

Another method and apparatus for reducing the likelihood of losing a portable electronic device is disclosed in U.S. Pat. No. 6,836,212 by Sawinski et al. titled Method and apparatus for reducing the likelihood of losing a portable electronic device and similarly in U.S. Pat. No. 7,005,999 by Salzhauer et al. titled Personal monitoring system.

These two inventions monitor inadvertent removal of a portable electronic device (PED) from its retaining device. So, if the PED is already removed from its retaining device for use or the retaining device and PED are left behind together or move out of a desired range, this apparatus does not protect users from losing their PEDS.

US patent application publication 20050280546 by Ganley et al. titled Proximity aware personal alert system discloses two mobile transceivers that are linked through a BLUETOOTH link. The BLUETOOTH enabled RF link between the first and second mobile transceiver units forms a monitoring piconet. The second mobile transceiver unit provides an alarm indication when the first mobile transceiver unit moves beyond a distance of approximately ten meters from the second mobile transceiver unit. The second device repeatedly pages the first device, and waits for a response. If a response is not received, an alarm is issued. This system does not use sleep modes effectively. It uses paging which consumes 40 mA, a rate that would inconvenience the user by requiring an expensive and/or heavy battery or frequent recharging. The system of the current invention relies on HFP or SPP link, and alerts on link drop.

Ganley teaches a two part system, whereas the current invention teaches a unitary system. Ganley does not teach a system for getting login parameters from a Bluetooth device and automatically logging the user to an application.

U.S. Pat. No. 6,989,748 by Rabanne et al. titled Battery with integrated tracking device discloses a battery with an integrated tracking device. The system is difficult to commercialize because of the large variety of batteries on the market. Furthermore, the transmitter/receiver system needs an antenna, and it would be a challenge to install an antenna inside the battery or on its surface as that would compromise its performance. This system also does not provide phone automatic login to applications functionality.

U.S. Pat. No. 5,796,338 by Mardirossian et al. titled System for preventing loss of cellular phone or the like discloses a system and method for preventing loss of a cellular phone or similar portable device. The system includes a wireless transmitter in cell phones for intermittently sending security signals to a pager worn by the user. An alarm is actuated when the strength of the security signal falls below a predetermined threshold. This system cannot be used with existing phones and requires cell phone manufacturers to modify their designs. This system also does not provide automatic login functionality.

U.S. Pat. No. 7,340,215 by Yokoshi et al. titled Communication system, communication terminal apparatus and wireless key apparatus discloses a method for restricting the operation of a mobile terminal when a connection with a BLUETOOTH key is not established. This system cannot be used with market-ready phones and requires cell phone manufacturers to modify their designs. This system also does not provide automatic login functionality.

US patent Application 2006/0083187 by Dekel et al. titled Pairing system and method for wirelessly connecting communication devices discloses a method for establishing a communication connection with a target device over a short-range wireless communication protocol, pairing with a device and forwarding the pairing request to a destination address over a wide area network. Dekel does not teach to alarm on loss of mobile device, or to provide automatic login function.

U.S. Pat. No. 7,054,595 by Bloch et al. titled Data security device discloses a backup device having memory and a wireless communication link. The backup device communicates periodically with a mobile device and may backup data. An alarm is activated to alert a user to loss of the mobile phone if the mobile phone is out of communication for a predetermined period.

Bloch does not teach automatic login to mobile applications. Bloch also does not teach API to integrate communication with BLUETOOTH device functionality into an application.

U.S. Pat. No. 7,463,861 and US patent applications 20090093215 and 20060199538 by Eisenbach et al. titled Automatic data encryption and access control based on BLUETOOTH device proximity teaches a method and apparatus for securing sensitive data on a secured Bluetooth device whereby when contact is lost, sensitive data is automatically encrypted, and when contact is restored, the data is automatically decrypted. Also, US patent application 20090047903 by the same inventor titled Automatic resource availability using BLUETOOTH teaches a method for designating trusted devices, and designating files as shareable. When in proximity to a trusted device, shareable files may be accessed securely. Similarly, US patent application 20060199536 by the same inventor titled Automatic network and device configuration for handheld devices based on BLUETOOTH device proximity teaches a method for automatically using the lowest cost connection from the available set of paired devices that are in proximity with the BLUETOOTH handheld device. These systems do not provide secure automatic login to applications and does not alarm when a mobile device is lost.

U.S. Pat. No. 7,526,295 by Khare et al. titled Integration of secure identification logic into cell phone teaches a method for generating a password based on a seed and synchronization time, and displaying the password on a mobile phone display. The user can use the password to access a network. The current prior art does not disclose a method or apparatus for proximity alarming or automatic login to an application.

U.S. Pat. No. 7,378,939 by Sengupta et al. titled Method and apparatus for providing proximity based authentication, security, and notification in a wireless system teaches a method for automatically locking a mobile device when an authentication device is not within proximity, while keeping the user logged in, wherein a locked device cannot be used by anyone and an unlocked device can be used by the user.

Sengupta invention teaches logging user to the wireless mobile device, i.e. at the operating system level, and not to an application running on said device. Sengupta invention does not teach an API that can integrate automatic login function into an application. It does not send the password to a RADIUS server. Furthermore, Sengupta system does not alarm when the mobile phone is lost or stolen.

U.S. Pat. No. 6,577,239 by Jespersen et al. titled Electronic apparatus including a device for preventing loss or theft also teaches a control device for sending an enabling signal to a mobile phone. The enabling signal enables operation of the mobile phone. If the mobile phone is no longer able to receive the enabling signal, then it is disabled. This patent does not teach a method for automatic login to an application.

U.S. Pat. No. 7,076,238 by Matsumoto et al. titled Wireless communication system exchanging encrypted data teaches a method for encrypting data and transmitting it to an electronic device together with a decrypting key. The current prior art does not disclose a method or apparatus for proximity alarming or automatic login to an application. The current prior art does not disclose a method or apparatus for proximity alarming or automatic login to an application that runs onboard the mobile phone.

U.S. Pat. No. 7,069,001 by Rupp et al. titled Method for supporting cashless payment teaches a method for authorizing payment transactions using a mobile phone. Rupp does not teach using an electronic device together with the mobile phone.

U.S. Pat. No. 7,106,171 by Burgess et al. titled Keyless command system for vehicles and other applications teaches a wireless remote-control transmitter with keypad for entering an identification code so that only an authorized operator can use the device. The described system does not provide automatic locking and unlocking for vehicles based on BLUETOOTH proximity.

U.S. patent application Ser. No. 11/204,483 titled Portable Loss Prevention System by the inventor granted recently describes a Bluetooth loss prevention system. The described system does not provide automatic login and single logon functionality.

Thus, a need exists for systems for monitoring mobile phones and for providing automatic login functionality to applications, automatic screen unlocking functionality, and automatic user authentication for transaction processing. Such systems should provide an alarm to users upon detecting that a phone is not within a desired proximity, wherein the alarm is appropriate to the circumstances. Further, there is also a need for more automatic login to applications and services while reducing the risk of loss and unauthorized access, and to make such systems ubiquitous as standard accessories.

SUMMARY OF THE INVENTION

A method for automatically logging a user to a client application, said client application can run on a first device, said client application is selected from the set comprising: enterprise application, mobile application, client-server application, web application, CRM application, mobile payment application, NFC payment application, comprising: establishing a BLUETOOTH two-way secure wireless connection between said first device and a second mobile device, said second mobile device comprising:
a single wireless transceiver selected from the set comprising a BLUETOOTH or Wibree transceiver, wherein said second mobile device can pair wirelessly with a compatible apparatus in a first range, wherein on pairing with a compatible apparatus in a first range, said second mobile device switches BLUETOOTH mode to non-discoverable, wherein said second mobile device can go to low-energy sleep mode, on wirelessly receiving user data from said second mobile device, said user data is selected from the set comprising: username, password, digital key, public key, private key, encryption key, encrypted user information, said user data is authenticated by authentication means selected from the set comprising: RADIUS server, client application authentication means, remote server authentication means, on successful authentication, said user is automatically logged to said client application.

A method for authorizing access to NFC application comprising: establishing a BLUETOOTH two-way secure wireless connection between a first device having NFC function and a second mobile device, said second mobile device comprising: a single wireless transceiver selected from the set comprising a BLUETOOTH or Wibree transceiver, wherein said single transceiver can pair with a second apparatus in a first range, wherein on pairing with a compatible apparatus in a first range, said single transceiver switches BLUETOOTH mode to non-discoverable, authenticating said second mobile device, said authentication comprises actions selected from the set comprising: verifying said BLUETOOTH two-way secure wireless connection is live, sending a message to said second mobile device and receiving a corresponding response from said second mobile device, inquiring for BLUETOOTH devices, and receiving a response from said second mobile device, sending a page to said second mobile device and receiving a corresponding response, requesting a list of services from said second mobile device and receiving a corresponding response, on authenticating said second mobile device, said access to NFC application is authorized.

A unitary apparatus, comprising: a power input; a flash storage means, an attachment means selected from the set comprising: a key chain, a ring, a clip, a single transceiver selected from the set comprising a BLUETOOTH or Wibree transceiver, wherein said single transceiver can pair with a second apparatus in a first range, wherein said single transceiver can establish a secure two-way wireless connection with a paired second apparatus, wherein on pairing with a compatible apparatus in a first range, said single transceiver switches BLUETOOTH mode to non-discoverable, wherein said single transceiver can go to sleep mode to conserve battery, wherein said single transceiver can send said user data wirelessly to said paired second apparatus, a single microcontroller, motion detection means for detecting motion, an alarm means whereby said alarm means can issue an audible sound of at least 60 decibels, a data port for connecting to a third device and for flashing user data onboard said flash storage means, whereby said user data is selected from the set comprising: seat position, steering wheel inclination, rear view mirror position, side mirror position, radio station, internet station, game selection, channel information, security code, access code, phone book, public key, private key, encryption key, decryption key, wherein said unitary apparatus can fit into a space having a volume less than 15 cubic centimeters, wherein said unitary apparatus has a weight less than about 100 grams, wherein said unitary apparatus has power consumption less than 100 mA.

BRIEF DESCRIPTION OF THE FIGURES

The present inventions may be more clearly understood by referring to the following figures and further details of the inventions that follow.

Similar reference numerals are used in different figures to denote similar components.

FURTHER DETAILS OF THE INVENTIONS

The most common model for PC application login generally relies on a set of user name and password that the user enters in a login screen. Once the user name and login are authenticated, the user gains access to the application.

This model has presents a few security problems. For example:

Multiple users can login with the same username/password,

A person can steal a username and password combination without the account owner noticing. The person can login into the system undetected.

For mobile phone applications, the phone generally goes to sleep mode after one minute of user inaction, and later, the user has to login again. For frequent users of mobile applications, this process is inconvenient and wastes them a lot of time.

The current invention utilizes features of BLUETOOTH to provide secure automatic access to mobile payment, mobile banking and mobile CRM applications thus increasing usability, convenience and efficiency to users while maintaining higher security standards. This new technology also provides an alarm when the user mobile terminal is away from the device of the invention, thus preventing loss and theft of mobile terminals.

Figure 1A:
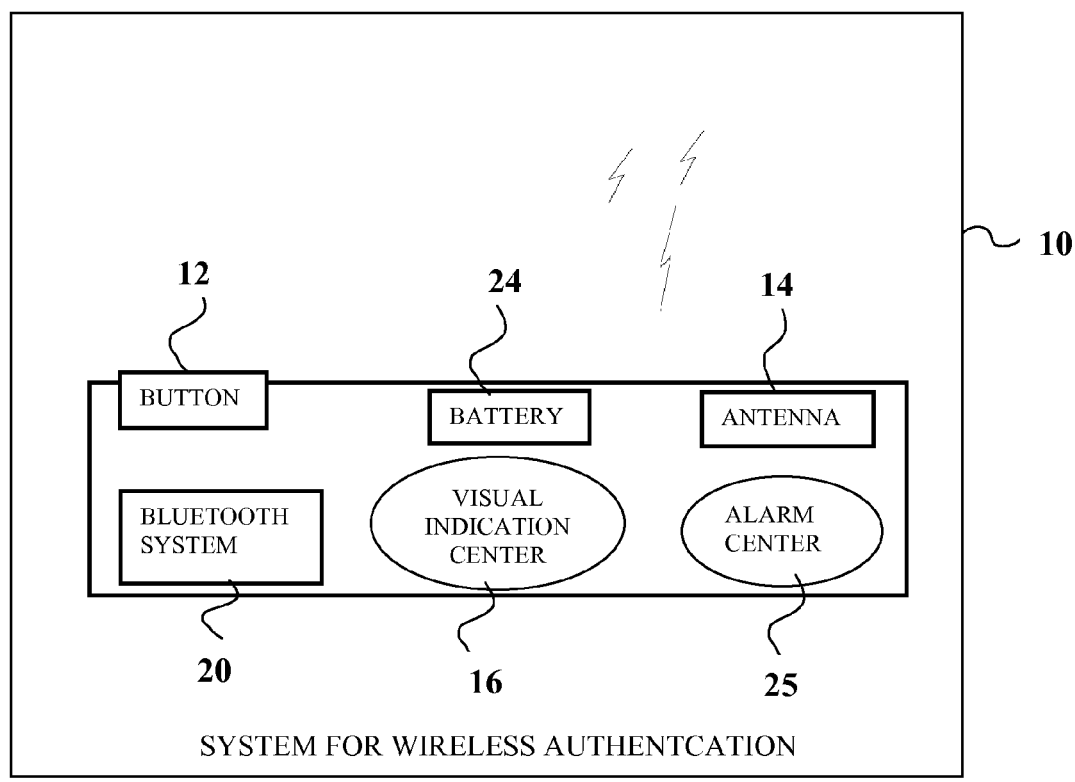
FIG. 1A is a schematic of a system for wireless authentication.

The following provides further details of the present inventions summarized above and illustrated in a schematic fashion in the Figures. In accordance with a first aspect of the present inventions, FIG. 1A is a schematic illustration of a system for wireless authentication 10 comprising a BLUETOOTH system 20 for short-range communication operatively connected with at least one Button or switch 12, a visual indication center (or display) 16, a battery (or power supply) 24, an communication/alarm center 25 and an antenna 14. Display 16 can be used to indicate the status of the device, such as whether it is powered, if the BLUETOOTH transceiver system (BT) is discoverable or non-discoverable, if the BT is pairing or paired with another BT, the BT mode, inter alia.

In a preferred embodiment, the components of the system for wireless authentication 10 can fit in a volume less about 60×30×10 mm or 18 cc, so that system for wireless authentication 10 can fit into a housing having an interior with dimensions of 60×30×10 mm or no more than 18 cc. In another embodiment, system for wireless authentication 10 can fit into a volume 10 cc, and weigh about 50 grams or less, and preferably less than about 10 g. Devices of the present invention should take up minimal volume and be light weight. For example, each device of the present inventions will preferably fit into a space having a volume of 56 cubic centimeters, 25 cubic centimeters, 22.5 cubic centimeters, 18 cubic centimeters, 10 cubic centimeters, or 1 cubic centimeters, and each device of the present inventions preferably has a weight less than about 200 grams, less than about 50 grams, or less than about 10 grams.

An attachment mechanism or system, including but not limited to a hook, harness, notebook security lock, insert, pin, clip, badge, clip, key chain, ring, tee, dog collar, Velcro, ring, fastening mechanism, sticky surface are optionally attached to the system for wireless authentication 10.

Control or activation switches 12 can be any type of button, switch, remote sensor, touch sensor, contact sensor or activation system. Activation switches 12 are used to turn the system for wireless authentication 10 ON/OFF, to shut off the alarm, to change the BLUETOOTH system mode to pairing mode, and/or to start voice transmission for embodiments that have a microphone and/or speaker. For example, a single control button can cycle through a menu of functions by changing the length of time that the button is held and/or the speed with which a first press is followed by a second press (analogous to the single and double click on a computer mouse). One or two control buttons coupled with a simple display screen can adjust a variety of operational parameters.

BLUETOOTH system 20 enables connectivity over the 2.4 GHz radio frequency (RF) band. BLUETOOTH system 20 includes a radio and base band IC for BLUETOOTH 2.4 GHz systems. In a preferred embodiment, BLUETOOTH system 20 includes ROM, Flash memory or external memory or any other type of memory. In an alternative embodiment, BLUETOOTH system 20 includes a power amplifier (PA) and/or low noise amplifier (LNA) for increasing the BLUETOOTH transmission range. BLUETOOTH system 20 is an integrated BLUETOOTH system 20 comprises a BLUETOOTH chip with on-chip microcontroller (such as the one supplied by CSR), Flash memory and antenna.

The BLUETOOTH specification (a de facto standard containing information required to ensure that devices supporting BLUETOOTH can communicate with each other worldwide) defines two transmission ranges for personal area networking. The range is between 10 m and 100 m without a line of sight requirement. The radio link is capable of voice and data transmission up to a maximum capacity of 720 kbps per channel. Any other range can be designed.

A BLUETOOTH network is completely self organising, and ad hoc personal area networks (PANs) can be established wherever two or more BLUETOOTH devices are sufficiently close to establish radio contact. Equipment capable of BLUETOOTH connectivity is able to self-organise by automatically searching within range for other BLUETOOTH-enabled devices. Upon establishing a contact, information is exchanged which determines if the connection should be completed or not. During this first encounter, the BLUETOOTH devices connect via a process of authorisation and authentication.

BLUETOOTH Pairing happens when two BLUETOOTH enabled devices agree to communicate with one another. When this happens, the two devices join what is can be referred to as a trusted pair. When one device recognizes another device in an established trusted pair, each device automatically accepts communication, bypassing the discovery and authentication process that normally happen during BLUETOOTH interactions.

When BLUETOOTH pairing is being set up, the following usually happens:
1. Device A (such as a handheld) searches for other BLUETOOTH enabled devices in the area.
How does A find these devices? The devices that are found all have a setting that makes them discoverable when other BLUETOOTH devices search. It's like raising your hand in a classroom: the discoverable devices are announcing their willingness to communicate with other BLUETOOTH devices. By contrast, many BLUETOOTH devices can toggle their discoverability settings off. When discoverability is off, the device will not appear when other devices search for it. Undiscoverable devices can still communicate with other BLUETOOTH devices, but they must initiate all the communications themselves.
2. A detects Device B (such as a second handheld that's discoverable).
During the discovery process, the discoverable devices usually broadcast what they are (such as a printer, a PC, a mobile phone, a handheld, etc.), and their BLUETOOTH Device Name (such as "Bob's Laptop" or "deskjet995c"). Depending on the device, you may be able to change the Device Name to something more specific. If there are 10 BLUETOOTH laptops and 5 BLUETOOTH mobile phones in range, and they are all discoverable, this can come in handy when selecting a specific device.

3. A asks B to send a Passkey or PIN
A passkey (or PIN) is a simple code shared by both devices to prove that both users agree to be part of the trusted pair. With devices that have a user interface, such as handhelds, mobile phones, and PCs, a participant must enter the passkey on the device. With other types of devices, such as printers and hands-free headsets, there is no interface for changing the passkey on the device, so the passkey is always the same (hard coded). A passkey used on most BLUETOOTH headsets is "0000". The passkeys from both parties must match.
4. A sends the passkey to B
Once you've entered the passkey on A, it sends that passkey to B for comparison. If B is an advanced device that needs the user to enter the same passkey, it will ask for the passkey. If not, it will simply use its standard, unchanging passkey.
5. B sends passkey back to A
If all goes well, and B's passkey is the same entered by A, a trusted pair is formed. This happens automatically when the passkeys agree. Once a trusted pair is developed, communication between the two devices should be relatively seamless, and shouldn't require the standard authentication process that occurs between two devices who are strangers. Embodiments of the present inventions take advantage of the reduced power requirements of certain BLUETOOTH modes following pairing of two BLUETOOTH enabled devices.

BLUETOOTH has several types:
i) Class 2: a class 2 BLUETOOTH transceiver can discover pair and communicate with any BLUETOOTH transceiver within a radius of 10 meters seamlessly.
ii) Class 1: A class 1 BLUETOOTH transceiver can discover pair and communicate with any BLUETOOTH transceiver within a radius of 100 meters.
iii) Class 3: A class 3 BLUETOOTH transceiver can discover pair and communicate with any BLUETOOTH transceiver within a radius of 2 meters.
iv) Non standard devices: can be designed to discover pair and communicate with any BLUETOOTH transceiver within any distance less than 300 meters.

In any wireless networking setup, security is a concern. Devices can easily grab radio waves out of the air, so people who send sensitive information over a wireless connection need to take precautions to make sure those signals aren't intercepted. BLUETOOTH technology is no different—it's wireless and therefore susceptible to spying and remote access, just like WiFi is susceptible if the network isn't secure. With BLUETOOTH, though, the automatic nature of the connection, which is a huge benefit in terms of time and effort, is also a benefit to people looking to send you data without your permission.

BLUETOOTH offers several security modes, and device manufacturers determine which mode to include in a BLUETOOTH-enabled gadget. In almost all cases, BLUETOOTH users can establish "trusted devices" that can exchange data without asking permission. When any other device tries to establish a connection to the user's gadget, the user has to decide to allow it. Service-level security and device-level security work together to protect BLUETOOTH devices from unauthorized data transmission. Security methods include authorization and identification procedures that limit the use of BLUETOOTH services to the registered user and require that users make a conscious decision to open a file or accept a data transfer. As long as these measures are enabled on the user's phone or other device, unauthorized access is unlikely. A user can also simply switch his BLUETOOTH mode to "non-discoverable" and avoid connecting with other BLUETOOTH devices entirely. If a user makes use of the BLUE- TOOTH network primarily for synching devices at home, this might be a good way to avoid any chance of a security breach while in public.

In the current application, once system for wireless authentication 10/11 is paired, it becomes "non-discoverable". Also, to further avoid any chance of a security breach, system for wireless authentication 10/11 does not have a reset button or reset function.

If reset is needed, an administrator may flash a new program file to system for wireless authentication 10/11 thus re-enabling the pairing capability. This feature is important as it prevents anybody from hacking the device or learning how it functions, or what protocols it uses.

Battery 24 provides power to some of the components of system for wireless authentication 10. Battery 24 can be a fuel cell, nickel-cadmium, lithium, lithium polymer, lithium ion, alkaline or nickel-hydride battery or any other portable source of electric power. Battery 24 can also be replaced with photovoltaic cells, a rechargeable battery, or a battery rechargeable from a distance (such as by induction). When system for wireless authentication 10 is not exchanging data or alarming, it remains in a dormant state ("sleep-mode") to conserve the energy of battery 24. On event selected from: receiving request for data, disconnect event detected, receiving request to establish voice channel, system for wireless authentication 10/11 leaves the sleep mode and wakes up.

For example, small 1.5 volt batteries, and the like, such as those used in small devices like hearing aids, calculators and watches are widely available and can be used as for a power source. One of ordinary skill in the art can readily determine the battery size and power requirements for different embodiments of the present inventions. It is envisioned that other low power specifications can be used in connection with the present inventions. For example, an ultra-low-power wireless technology called Wibree has been developed. Wibree addresses devices with very low battery capacity and can be easily integrated with BLUETOOTH technology.

Visual indication center 16 is one or more LED. The LED can turn on and off periodically to indicate the system is on. The color and frequency of the LEDs can indicate different events such as normal mode, pairing mode, alarm mode, low battery mode, voice mode, etc.

In another embodiment, visual indication center 16 can be an LED, LCD or any other indication means, and alarm center 25 includes an alarm audible from a distance greater than 6 feet. A regular alarm is between 65 and 120 decibels at 10 feet. Noise levels above 85 decibels can harm hearing over time. Noise levels above 140 decibels can cause damage to hearing after just one exposure. In a preferred embodiment, alarm center 25 has more than 50 decibels or 50 dBA at 10 feet or exceeds ambient sound level by 5 decibels minimum. In a preferred embodiment, the alarm provides an audible signal of at least 60 decibels to notify the user of a designated event, such as user leaving proximity of mobile phone. The human ear does not respond equally to all frequencies: humans are much more sensitive to sounds in the frequency range about 1 kHz to 4 kHz (1000 to 4000 vibrations per second) than to very low or high frequency sounds. Sound meters are usually fitted with a filter that has a frequency response similar to the human ear. If the "A weighting filter" is used, the sound pressure level is given in units of dB(A) or dBA. In residential areas, most noise comes from transportation, construction, industrial, and human and animal sources. Road traffic noise is the leading source of community noise. The noise can be highly variable. It is common that Day—Night sound levels in different areas vary over a range of 50 dB. The outdoor level in a wilderness area may occur as low as 30 to 40 dBA, and as high as 85-90 dBA in an urban area. Most urban dwellers lives in areas of noise level more than 48 dBA.

It is noted that system for wireless authentication 10/11 may include an onboard motion detector or tilt detector and may activate alarm if motion is detected using the onboard motion detector or tilt detector, and if motion is not detected, a short alert may be issued. The case where motion is not detected generally corresponds to the user staying at home, office or coffee shop . . . , and leaving system for wireless authentication 10/11 on a table while the mobile phone leaves proximity. These cases do not require an alarm and are therefore associated with a short alert.

System for wireless authentication 10/11 can provide intelligent alarm on loss of the mobile device that depends on the motion state. This is important as it enables to reduce the number of false alarms when the user is at home or in the office, and the Bluetooth device which generally is attached to keys is laying on the table. This enables the user to use the mobile phone, and leave proximity of the Bluetooth device without triggering an alarm. To be safe, a short alert can be issued.

Alarm center 25 can be any type of audio, video, tactile or mechanical user interface means capable of conveying information to the user. Audio means can be any audio device such as a speaker, a buzzer, a Piezo buzzer, omni-directional speaker, directional speaker, an ultrasound or any other audio device. Visual means can be an LED, or any visual information display device. Tactile means can be any tactile sensor such as a vibrator, or a heat-generating device.

Antenna 14 can be any type of antenna including chip antenna, patch antenna, PCB antenna and dipole antennas.

In an embodiment, system for wireless authentication 10 can be inserted beneath the skin of a human or animal or included inside the housing of objects such as portable computers. In an embodiment, system for wireless authentication 10 is contained within a capsule formed of an implant-grade material that has minimal risk for rejection by mammalian immune systems and the capsule inserted under the skin. It can also be carried as a keychain or attached to people, animals or objects through a hook, harness, notebook security lock, insert, pin, clip, badge, clip, key chain, ring, tee, dog collar, Velcro fastener, ring, fastening mechanism, sticky or adhesive surface or any other attachment mechanism. Many notebook computers have a security slot on the side, which can be utilized by inserting a notebook security lock; the lock can be attached to an external device, such as a cable or desktop securing mechanism.

System for wireless authentication 10 can also be encased in waterproof packaging and attached to clothes. The packaging can also be shock or impact resistant. System for wireless authentication 10 can be incorporated in any other plastic or portable electronic device or object, including for example a cell phone, PDA, a wireless email device, an instant messaging device or pager, a portable computer, an MP3 player, a portable music player, a portable radio device, or any portable electronic device. System for wireless authentication 10 can also be sewn into clothes. Preferably, system for wireless authentication 10 is as small as is practical so as to avoid distracting or annoying the person or animal carrying it. In an embodiment, the present invention includes clothing that has at least one pocket for holding the remote proximity sensor; the pocket has a closure that can be repeatedly opened and closed to operate the device and/or to remove it for other uses and/or users. Preferably, system for wireless authentication 10 has dimensions of less than 10 cm×10 cm×5 cm (otherwise stated as "10×10×10cm") and is less than 200 g in weight. In an embodiment, there are no manually operated controls (e.g., off-on or activation button is magnetically operated, so the housing is not provided with button or switch access), and the device may not have a display. In an embodiment, the housing of the device includes at least one seal and/or is waterproof so that immersion in water, or preferably even running the device through laundering machines, does not damage the electronic components. In a preferred embodiment, system for wireless authentication 10 has a size equal to or smaller than 5 cm×3 cm×1.5 cm or 22.5 cubic centimeters ("cc"). A device having the desired functions of the present inventions can fit all of its components into a volume less than 1000 cc, preferably less than about 56 cc, 22.5 cc, and even 10 cc. Each mobile proximity sensor or remote sensor weighs less than 200 grams, preferably less than 50 g, and even less than 10 g. A preferred device has no than four manually operated buttons or switches, and preferably has only one manually operated button or activation switch and no more than one display A user application running on a mobile device or a PC can be programmed to verify that the system for wireless authentication 10/11 is within proximity, and if so, the user is logged in automatically without entering information in a login screen. The login parameters are transferred wirelessly when they are needed by the application and authenticated by either the application or a RADIUS server.

If the user does not have the device with him/her, a login screen may be used to enter authentication parameters and gain access to the application.

This feature allows the client to gain more convenience and efficiency, especially in the case of an enterprise, banking, payment application, NFC (Near Field Communication) payment running on a mobile phone or PDA, where:

User login security is required

Device goes to sleep every 1 to 5 minutes of inactivity and user has to login again In the PC/laptop world, the user can be logged in for a long period of time even when the device is inactive. This is because energy is not scarce and loss and theft are not a big concern.

In the mobile device world, batteries are very limited in size, and device must go to sleep to conserve it. Furthermore, device loss and theft risk is much higher than a PC. Therefore, system must go to sleep frequently, and user must login after every period of sleep so that if the device falls in the wrong hands, the new user cannot access data. In the case of a person that uses an enterprise CRM (Customer Relationship Management) application that requires frequent data input, the login process is cumbersome.

In the case of a payment application, mobile banking, client-server application, web application where the user has to enter a login every time a transaction is made, the login process is also inconvenient and may turn off customers from using the application. In the case of NFC payment, device-assisted authentication is necessary because speed of transaction is important for merchants, and mobile phone security is important for the user. With system for wireless authentication 10/11, we can make the system seamless, provide fast authentication, and secure the terminal, all at the same time.

On connection drop, the system for wireless authentication 10/11 may logout the user, may attempt to reconnect and can issue an intelligent alarm.

System for wireless authentication 10/11 may request user data such as username, password, digital key, public key, private key, encryption key, (the user data may be encrypted) and if the user data is received and authenticated, access is granted to the user. If the user data is not received or not authenticated, then access is refused. A login screen may be displayed to the user.

The user data may be updated by connecting system for wireless authentication 10/11 to a computer and flashing the user data to it.

System for wireless authentication 10/11 may have a sleep mode and when in sleep mode, battery consumption is below 1 mA. System for wireless authentication 10/11 consumption is generally below 40 mA. Its size is below 10 cubic centimeters, and it weighs less than 25 grams.

The system for wireless authentication 10/11 pairs with a second apparatus. Once paired, it becomes undiscoverable or invisible to any other device except second apparatus and will not respond to any request from any device except second apparatus. It can establish secure two-way wireless connection with a second apparatus.

The system for wireless authentication 10/11 can store user data such as password, private key, authentication parameter, personal info, biometric info, operation hours, operation days, buzzer type, buzzer volume, buzzer duration, and alarm type. Those parameters can be flashed on system for wireless authentication 10/11 by connecting it to another programming device (e.g. programmer, vehicle computer). Those parameters can also be transferred wirelessly and stored.

System for wireless authentication 10/11 automates the login process, increases usability and convenience, and makes access more secure. That is because device authenticated access does not suffer from short comes of password authenticated access. For example, username and password can easily be shared between multiple users as oppose to access devices. When a username/password combination is stolen, the user may not notice it, however, when an access device is stolen, the user will notice it and take appropriate actions.

System for wireless authentication 10/11 is a good alternative to the Solution to Enterprise Single Sign-On (SSO). Users do not memorize any password. Users carry an access device, and that access device remembers all the rest (for example passwords to multiple applications), providing a truly automated login experience that is superior to Single Sign-On.

System for wireless authentication 10/11 may store multiple login parameters corresponding to multiple client applications, and when client application requests login parameters, system for wireless authentication 10/11 automatically determines login parameters corresponding to the client application and sends those parameters wirelessly.

Furthermore, system for wireless authentication 10/11 can remove the risk of device loss and theft for enterprise users and frequent users, as the system will intelligently alarm if the associated mobile device is not within proximity or is left behind, i.e. without causing many false alarms.

It is noted that system for wireless authentication 10/11 may sense motion using a motion detector, and therefore provide intelligent alarming based on motion state. For example, if the device has recently sensed motion, then an alarm is required on connection drop. If the device has not sensed motion for a while, it may be understood that the user is not carrying the device and therefore a soft alarm is required. For example, when the user is at home or office, and leaves the keychain on a counter, the user can move the mobile phone out of proximity of the system for wireless authentication 10/11 without triggering a strong alarm.

In an alternative embodiment, the client application is accessed from a PC, a mobile device or a web browser running on a Personal Electronic Device (PED) may send a wireless message to system for wireless authentication 10/11 and request user parameters. If requested user parameters are received wirelessly, the user is automatically granted access to the application.

In another alternative embodiment, the client application may send a wireless message to system for wireless authentication 10/11 and request user parameters. If response is received wirelessly, user parameters are extracted and are automatically filled in the login screen, and the user is automatically logged to the application. The sent request and/or response may be encrypted or obfuscated for added security.

In another alternative embodiment, the client application may send an inquiry, a page or a service discovery request to system for wireless authentication 10/11. If response is received wirelessly, the user is automatically logged to the application.

If system for wireless authentication 10/11 is not working due to low battery or if the user forgot or lost the device, the user can be granted traditional username/password access to the application.

Once the user is logged in, the user may be logged out shout a connection drop to system for wireless authentication 10/11 be detected. The user device providing access to the application may also attempt to reconnect.

System for wireless authentication 10/11 may have a lighted area where a logo can be placed. For example, the status LED can be used to periodically light a logo thus increasing the value of the system.

System for wireless authentication 10/11 can be programmed so that on pairing with a second device, it sends a file to the second device. The file is stored in flash memory. It can also be programmed to send different files at different schedules. More over, system for wireless authentication 10/11 can receive files from trusted sources when in proximity from the trusted sources and send them to paired second device. The trusted sources can be BLUETOOTH servers that are previously paired with system for wireless authentication 10/11. System for wireless authentication 10/11 can be programmed to receive files from compatible devices of a predetermined Class, so that when a trusted source is programmed to transmit a file, and system for wireless authentication 10/11 comes within proximity, system for wireless authentication 10/11 receives the file.

Figure 1B:
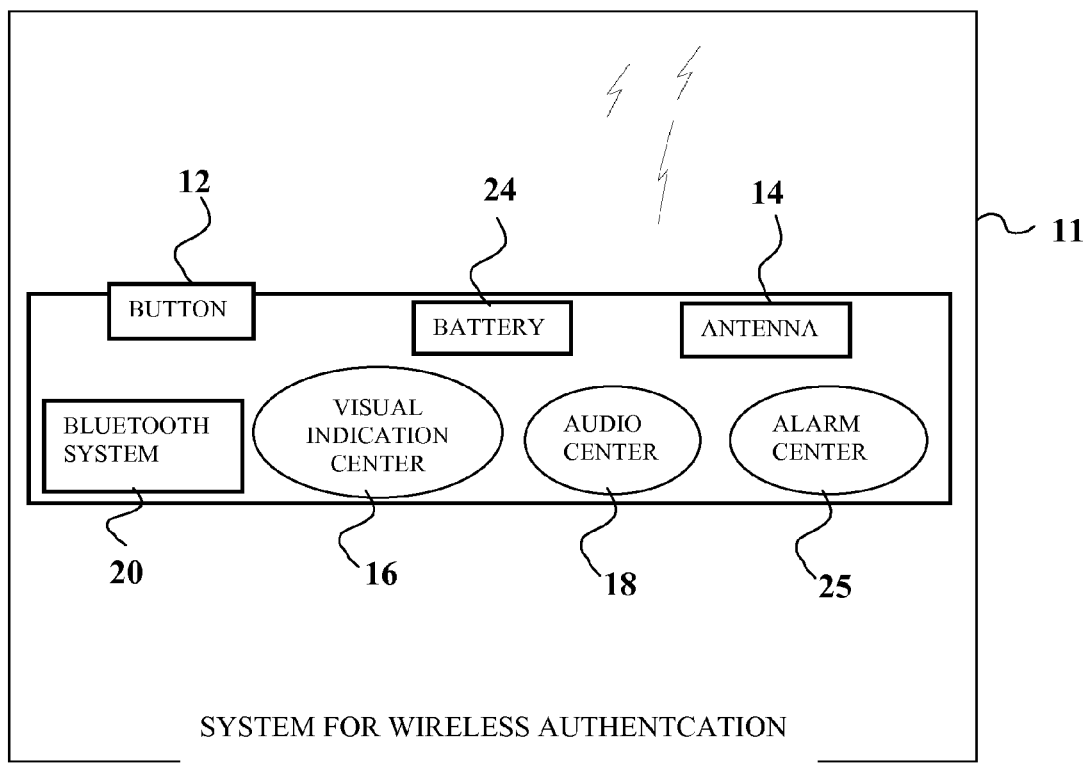
FIG. 1B is a schematic of an alternative system for wireless authentication.

FIG. 1B is a schematic of an alternative system for wireless authentication 10/11 comprising a BLUETOOTH system 20 connected with activation switches 12, visual indication center (or display) 16, audio center 18, battery (or power supply) 24, alarm center 25 and antenna 14, Audio center 18.

Audio center 18 can be any type of microphone, speaker, earphone wire, foldable earpiece, slid able earpiece, etc. In a preferred embodiment, the electronic components of system for wireless authentication 10/11 can fit into a volume of about 60×30×10 mm or 18 cc or less. For example, system for wireless authentication 10/11 may fit into a volume less than about 56 cc, 22.5 cc, 18 cc or 10 cc.

In another embodiment, system for wireless authentication 10/11 with a foldable or slide able earpiece can detach from a second piece comprising an attachment system that can attach to a keychain. This enables a user to easily switch from using system for wireless authentication 10/11 as a keychain, to using it as a headset on receipt of a call by detaching the main body, folding or sliding an earpiece and inserting it in the ear.

System for wireless authentication 10 and 11 can also comprise or be incorporated into another PED or mechanical device, including but not limited to a BLUETOOTH headset, a flash memory, an MP3 or MP4, a recording device, headphones, a bank or credit card, a remote control, a security device, a language translator, a biosensor, a comb, a lighter, a car key, a home key, a keychain, and a Swiss knife, inter alia.

Figure 1C:
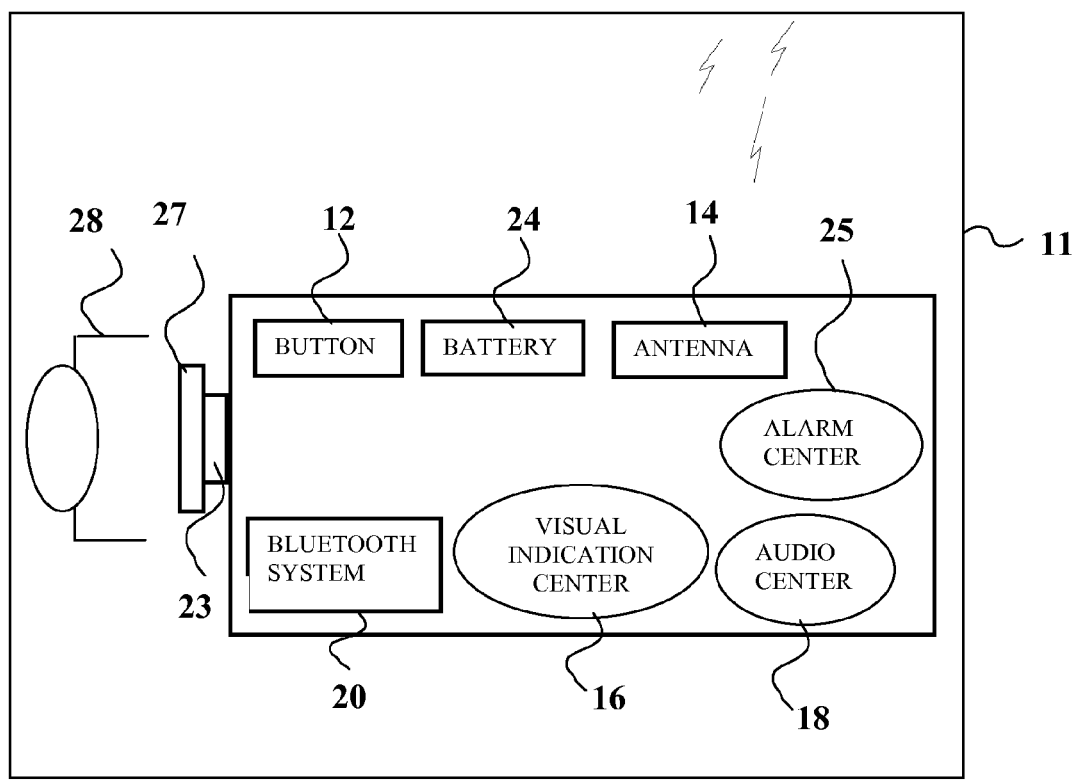
FIG. 1C is a schematic of an alternative system for wireless authentication with voice functionality.

Referring to FIG. 1C, an alternative schematic illustration of a system for wireless authentication 10/11 comprises a transceiver system 20 connected with activation switches 12, visual indication center (or display) 16, power store 24, communication center 25, antenna 14, Audio center 18, bearing 23, speaker 27 and capsule 28.

Bearing 23 can be a pivot, articulation, U joint, a ball joint, pop-up coil, slide rail, a telescoping tube, or any attachment mechanism for a detachable or movable earpiece. Bearing 23 may be mounted to speaker 27 and may allow adjusting the angle and distance of speaker 27 relative to the main body of system for wireless authentication 10/11 across one or more planes for better comfort.

Capsule 28 can easily attach and detach to system for wireless authentication 10/11. Capsule 28 allows protecting speaker 27 while not in use. Capsule 28 can attach to a key chain and allow easy carrying of system for wireless authentication 10/11 as a key chain when not in use as a headset, and to easily detach it and use it as a headset when needed.

Figure 2A:
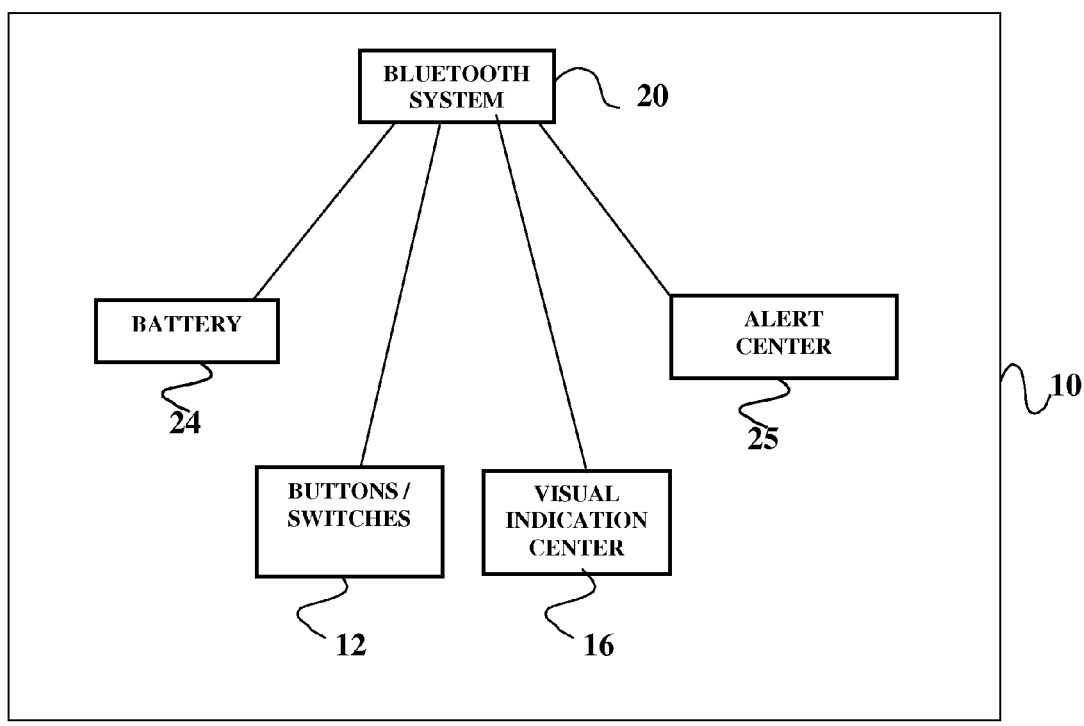
FIG. 2A is a block diagram of system for wireless authentication.

Referring to FIG. 2A, in an embodiment, system for wireless authentication 10 comprises a BLUETOOTH system 20 connected with activation switches 12, visual indication center 16, a battery or power supply 24, and alert (or alarm) center 25.

Figure 2B:
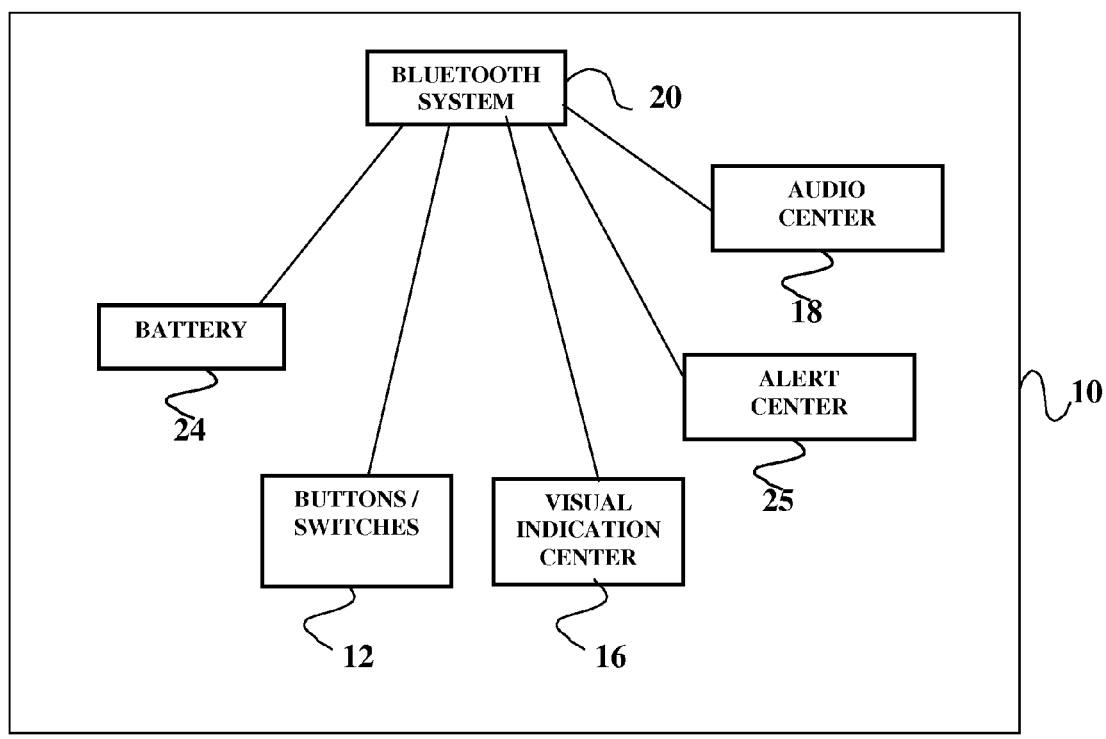
FIG. 2B is a block diagram of system for wireless authentication.

Referring to FIG. 2B, in an embodiment, system for wireless authentication 10 comprises a BLUETOOTH system 20 connected with activation switches 12, visual indication center 16, a battery or power supply 24, alert (or alarm) center 25 and audio center 18.

Figure 2C:
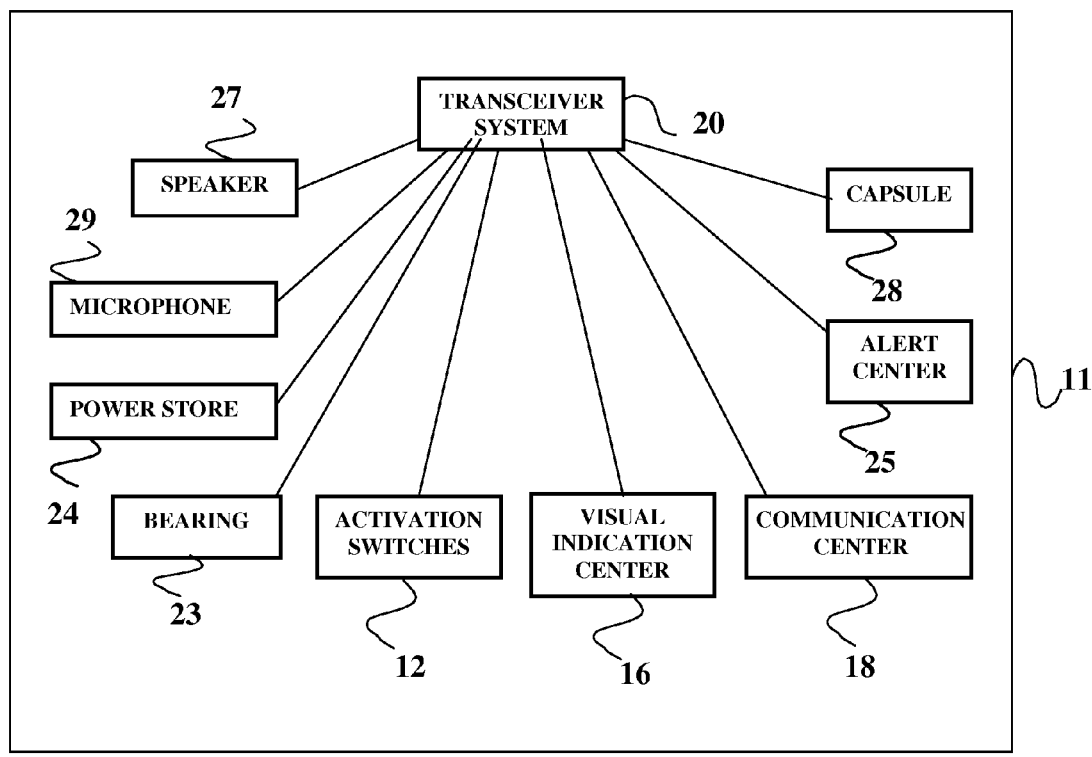
FIG. 2C is a block diagram of system for wireless authentication with voice functionality.

Referring to FIG. 2C, system for wireless authentication 10/11 comprises a transceiver system 20 connected with activation switches 12, visual indication center 16, power store 24, communication center 25, audio center 18, bearing 23, speaker 27 and microphone 29. Microphone 29 is any device capable of capturing voice.

Figure 3:
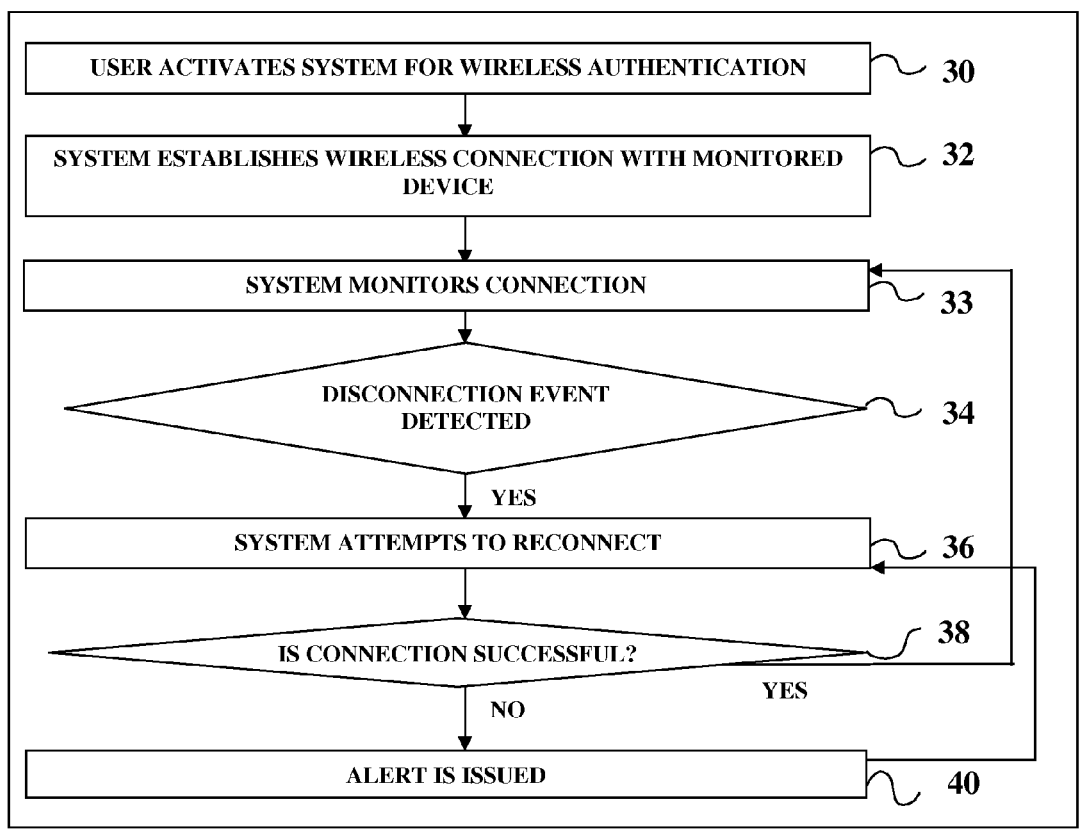
FIG. 3 is a flowchart illustrating the operation of a system for wireless authentication.

Turning now to FIG. 3, the flowchart illustrates the steps involved in detecting that a portable electronic device (PED) is outside a desired range of a base device (a base device may be referred to as a master and the monitored remote devices referred to as slaves). The PED can be for example a mobile phone, a PDA, a wireless email device, an instant messaging device, a pager, a portable computer, an MP3 player, a portable music player, a portable radio, or any PED. In step 30, the user activates system for wireless authentication 10/11 by pressing activation switch or button or switch 12.

Switch 12 has several modes. In a preferred mode, a long press of activation button or switch 12 on the base unit 10 indicates ON/OFF event. A long press may be defined by either the length of time that Button or switch 12 is manually held in a second position against a bias that holds the switch in a first position when at rest, or a signal may be given to indicate that a desired mode of operation or desired action has been initiated. For example, a very long press can cause a switch to pairing mode. Button or switch 12 can be used to dial a number, or to perform actions such as accept/reject a call, or play/stop/forward/back.

In step 32, BLUETOOTH system 20 in a base unit establishes a BLUETOOTH connection with a monitored remote device. The wireless connection can be an HSP (headset profile) connection, a HFP (Hands-Free profile) connection, iAP (iphone SPP). Other connection profiles may be possible. BLUETOOTH system 20 does not redirect voice calls from the mobile phone to itself as a headset would do, thus the mobile phone operations remain intact. BLUETOOTH system 20 uses a BLUETOOTH operational mode that uses minimal power, e.g., one of sniff, hold, or park modes. In a preferred embodiment, only BLUETOOTH sniff mode is used after pairing to assure low power usage and optimize convenience to the user by reducing the frequency of battery recharging or replacement.

In sniff mode, a device listens only periodically during specific sniff slots, but retains synchronization with the paired BLUETOOTH device onboard the monitored device. In other embodiments, BLUETOOTH system 20 can use hold mode wherein a device listens only to determine if it should become active, or park mode wherein a device transmits its address. Sniff mode assures very low power consumption and thus extends battery life. In sniff mode, a BLUETOOTH master radio frequency unit (e.g., base) addresses a slave radio frequency unit (e.g., remote), which enables the slave to synchronize to the master by sending poll packets and optionally null packets over an active link, the master being arranged so that receipt of a response from the slave unit to a poll packet is sufficient to maintain the active link. The slave unit does not have to respond to all poll packets. This approach can allow the slave to preserve more (transmit) power by going into a deep sleep mode in which a low power oscillator may be used while still allowing the master unit to detect whether the slave has resynchronized or not (and thus to update a Link Supervision Timer, for example).

BLUETOOTH Wireless Technology Profiles: In order to use BLUETOOTH wireless technology, a device must be able to interpret certain BLUETOOTH profiles. The profiles define the possible applications. BLUETOOTH profiles are general behaviors through which BLUETOOTH enabled devices communicate with other devices. BLUETOOTH technology defines a wide range of profiles that describe many different types of uses.

At a minimum, each profile specification contains information on (1) dependency on other profiles, (2) suggested user interface formats, and (3) specific parts of the BLUETOOTH protocol stack used by the profile. To perform its task, each profile uses particular options and parameters at each layer of the stack. This may include an outline of the required service record, if appropriate.

Hands-Free Profile (HFP). HFP describes how a gateway device can be used to place and receive calls for a hands-free device. A typical configuration is an automobile using a mobile phone for a gateway device. In the car, the stereo is used for the phone audio and a microphone is installed in the car for sending outgoing audio. HFP is also used for a personal computer to act as a speaker phone for a mobile phone in a home or office environment. HFP uses SCO to carry a mono, PCM audio channel.

Headset Profile (HSP). The HSP describes how a BLUETOOTH enabled headset should communicate with a computer or other BLUETOOTH enabled device such as a mobile phone. When connected and configured, the headset can act as the remote device's audio input and output interface. The HSP relies on SCO for audio and a subset of AT commands from GSM 07.07 for minimal controls including the ability to ring, answer a call, hang up and adjust the volume.

Serial Port Profile (SPP). SPP defines how to set-up virtual serial ports and connect two BLUETOOTH enabled devices. SPP is based on the ETSI TS07.10 specification and uses the RFCOMM protocol to provide serial-port emulation. SPP provides a wireless replacement for existing RS-232 based serial communications applications and control signals. SPP provides the basis for the DUN, FAX, HSP and LAN profiles. This profile supports a data rate up to 128 kbit/sec. SPP is dependent on GAP. iAP is similar to SPP.

RFCOMM. The RFCOMM protocol emulates the serial cable line settings and status of an RS-232 serial port and is used for providing serial data transfer. RFCOMM connects to the lower layers of the BLUETOOTH protocol stack through the L2CAP layer. By providing serial-port emulation, RFCOMM supports legacy serial-port applications while also supporting the OBEX protocol among others. RFCOMM is a subset of the ETSI TS 07.10 standard, along with some BLUETOOTH-specific adaptations.

Advanced Audio Distribution Profile (A2DP). A2DP describes how stereo quality audio can be streamed from a media source to a sink. The profile defines two roles of an audio source and sink. A typical usage scenario can be considered as the "walkman" class of media player. The audio source would be the music player and the audio sink is the wireless headset. A2DP defines the protocols and procedures that realize distribution of audio content of high-quality in mono or stereo on ACL channels. The term "advanced audio", therefore, should be distinguished from "BLUETOOTH audio", which indicates distribution of narrow band voice on SCO channels as defined in the base band specification.

Audio/Video Control Transport Protocol (AVCTP). AVCTP describes the transport mechanisms to exchange messages for controlling A/V devices.

Audio/Video Distribution Transport Protocol (AVDTP). AVDTP defines A/V stream negotiation, establishment and transmission procedures.

Audio/Video Remote Control Profile (AVRCP). AVRCP is designed to provide a standard interface to control TVs, hi-fi equipment, or other A/C equipment to allow a single remote control (or other device) to control all the A/V equipment that a user has access to. It may be used in concert with A2DP or VDP. AVRCP defines how to control characteristics of streaming media. This includes pausing, stopping and starting playback and volume control as well as other types of remote control operations. The AVRCP defines two roles, that of a controller and a target device. The controller is typically considered the remote control device while the target device is the one whose characteristics are being altered. In a "walkman" type media player scenario, the control device may be a headset that allows tracks to be skipped and the target device would be the actual medial player.

iPhone has a proprietary protocol (similar to SPP) for communicating with BLUETOOTH devices. iPhone requires an Apple proprietary chipset on other BLUETOOTH devices in order to use the proprietary protocol. For that reason, in another preferred embodiment, the system for wireless authentication 10/11 has an Apple proprietary chipset for enabling communication through BLUETOOTH or for enabling usage of iAP protocol.

In step 33, BLUETOOTH system 20 monitors the BLUETOOTH connection automatically. In this step, BLUETOOTH system 20 is in sniff mode, and power consumption is below 1 mA. A significant benefit of this system is the ability to monitor a connection while keeping power consumption to a very low level. This enables one of ordinary skill in the art to build portable devices in accordance with the present inventions that use small batteries (100-200 mAh), which can last for at least 2 or 3 weeks before being recharged or swapped. In step 34, on detection of connection drop, i.e., disconnection, BLUETOOTH system 20 attempts to reconnect in step 36. For example, when a connection is dropped while the system is in sleep mode or sniff mode, a BLUETOOTH system can automatically generate an event indicating connection drop. In the base and/or remote devices of the present invention, upon the BLUETOOTH system indicating a connection drop either the base and/or the remote will attempt to reconnect to one another or an alarm will be triggered in the base and/or the remote, as illustrated by issuance of an alarm in step 40. For a mobile phone proximity detector, a connection drop is generally due to the distance between BLUETOOTH system 20 and the mobile phone being too large, an obstacle between the two devices, and/or the mobile phone powered down. One of ordinary skill in the art will understand from the foregoing that the programming of the BLUETOOTH system can be adjusted to include instructions to reconnect and/or to trigger an alarm in accordance with the present invention. Automatic reconnection minimizes false alarms and makes the systems of the present invention more reliable and easy to use. An exemplary benefit of the automatic reconnect feature is that when a user comes into proximity of the mobile phone from out of range, the alarm automatically shuts off without requiring any additional input from the user.

In an embodiment of the present inventions, the BLUETOOTH system will generate an indication or message on detection of a connection drop. For example, firmware running on a BLUETOOTH chipset, or on a virtual machine which in turn runs on a BLUETOOTH chipset, can receive or capture that disconnect indication or message. The present invention includes programming that instructs one or more responses to a disconnect indication. For example, the program will instruct a reconnection attempt and/or instruct issuance of an alarm. One of ordinary skill in the art can use market available development tools to write programming to perform the desired functions. It has been discovered by the present inventor that the disconnect event indicator is reliable for detecting that a monitored device is outside a desired range. The claimed invention has an automatic reconnect attempt feature, so that upon detection of a disconnect event, reconnection is attempted; this can avoid many false alarms. Preferably, in an embodiment, an alarm instruction is not given until at least one active reconnect attempt is made and fails. Upon the alarm issuing, periodic reconnect efforts are made, and upon reconnection the alarm will not continue. Avoidance of false alarms makes the invention more convenient for the user.

Figure 4:
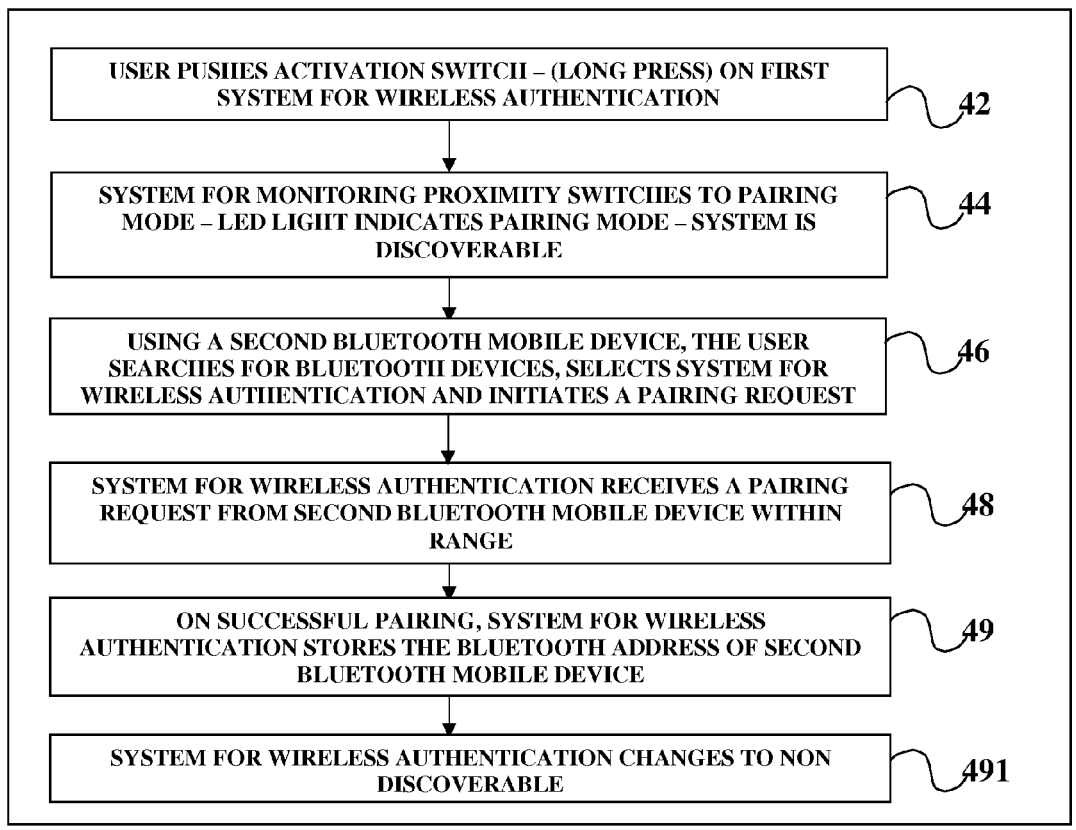
FIG. 4 is a flowchart illustrating initiating the system for wireless authentication.

Turning now to FIG. 4, the flowchart illustrates the steps involved in initializing the system for wireless authentication 10. In step 42, the user pushes Button or switch 12 for a sufficiently long duration, or presses a button a predetermined number of times, to indicate that the user wants to "pair" the system for wireless authentication 10 with a new device to be monitored (i.e., the user makes a "long press"). In step 44, the system for wireless authentication 10 enters pairing mode. Visual indication center 16 can indicate pairing mode using a combination of LED effects, for example, alternating colored LEDs. When BLUETOOTH system 20 is set to discoverable mode, in accordance with step 46 the user uses a second BLUETOOTH mobile device to be monitored to search for BLUETOOTH devices in range and to select the system for wireless authentication 10 from the search list. In a preferred embodiment, the system for wireless authentication 10 appears as a headset to other BLUETOOTH mobile devices. When the user initiates a pairing request, as shown in step 48, the system for wireless authentication 10/11 receives a pairing request from the device to be monitored, and requests a PIN code. On successful pairing in step 49, the system for wireless authentication 10 obtains the BLUETOOTH address of the device to be monitored and stores it in memory as shown by step 491. BLUETOOTH system 20 changes to non-discoverable mode and visual information center 16 changes to normal mode.

Figure 5:
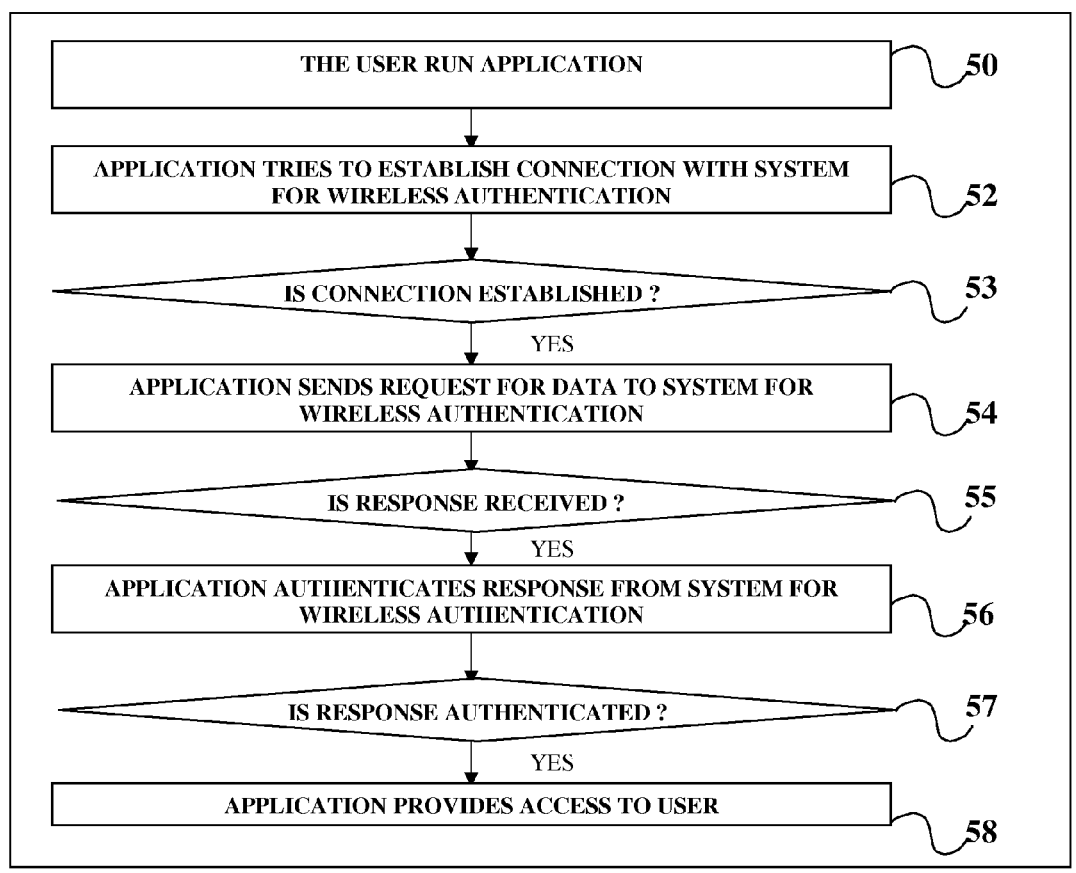
FIG. 5 is a flowchart illustrating configuring the system for wireless authentication.

Turning now to FIG. 5, the flowchart illustrates an alternative embodiment using an application. The application can be a corporate application, a web application, a CRM (customer relationship management) application, mobile banking application, NFC (near field communication) application, payment application or other. The application can run on a mobile device such as a mobile phone or PDA, or a PC.

In step 50, the user launches an application. In step 52, the application tries to establish connection with system for wireless authentication 10/11. If connection is established, the application sends a request for data to system for wireless authentication 10/11 in step 54. If response is received, the application authenticates the response in step 56.

Authenticating a response may involve local authentication, whereby the received data is authenticated.

Authenticating a response may involve communicating with a server, sending data such as user name and password to the server, and waiting for server authentication.

Authenticating a response may involve sending data to a RADIUS server (Remote Authentication Dial In User Service) that provides centralized access and authorization.

In another embodiment, the application sends a seed and a synchronization time to system for wireless authentication 10/11. System for wireless authentication 10/11 uses a pseudo-random number generator to generate a password, and sends it back to the application. The application sends the password to a server that compares the password to a pseudo-random number generator at the server. If the foregoing matches, the server grants access to the client.

It is noted that once the two-way wireless communication channel is established, the application communicates with system for wireless authentication 10/11 in real-time. If authentication is successful, the application automatically provides access to the user in step 58.

In an alternative embodiment, if connection is not established, response is not received, or response is not authenticated, the application displays a login screen.

In an alternative embodiment, the user may enter configuration parameters for system for wireless authentication 10/11 through an application. Configuration parameters may include but are not limited to user name, password, private key, authentication parameter, personal info, biometric info, operation hours, operation days, buzzer type, buzzer volume, buzzer duration, alarm type, and user preferences such as seat position, steering wheel inclination, rear view mirror position, side mirror position, radio station, security code and access code. The configuration parameters are flashed onboard the system for wireless authentication 10.

In another preferred embodiment, system for wireless authentication 10/11 can also be used as an automobile key. System for wireless authentication 10/11 can store user preferences such as: seat position, steering wheel inclination, rear view mirror position, side mirror position, radio station, security code, access code.

When the user pulls a door handle, the automobile electronic system requests authentication parameters from system for wireless authentication 10/11 and if authenticated, automatically unlocks the door. When a connection drop is detected, the door is automatically locked.

When the user presses the engine button, the automobile electronic system authenticates system for wireless authentication 10/11 and starts the engine.

The automobile electronic system can request user parameters from system for wireless authentication 10/11 can use the user information to adjust seat position, adjust wheel position, adjust side mirror position, adjust rear view mirror position or adjust radio station.

In another preferred embodiment, system for wireless authentication 10/11 comprises a keypad for entering user data. Alternatively, it may comprise a finger print scanner, a voice synthesizer or an iris scanner for authenticating user. System for wireless authentication 10/11 may comprise an LCD.

In another preferred embodiment, system for wireless authentication 10/11 comes with an API (application programming interface) that allows developers to integrate wireless authentication in their applications based on BLUETOOTH proximity. Wireless authentication means automatic login function or single log-on function based on BLUETOOTH proximity. The login may involve verifying the user credentials against a local database or sending them to a Remote Authentication Dial In User Service (RADIUS) server. The developer application can be any PC, server or mobile terminal application including web applications that run in a browser. When system for wireless authentication 10/11 is within proximity, the user is logged in automatically. When system for wireless authentication 10/11 is out of proximity, the user is not logged in automatically. This provides a secure platform for enterprise applications where access is granted to people that carry system for wireless authentication 10/11, however, unauthorized users that do not carry system for wireless authentication 10/11 are not granted access. This feature also prevents identity theft and unauthorized access. Furthermore, since mobile phones and mobile terminal can be lost stolen and forgotten, this system prevents loss and theft, and at the same time prevents access by unauthorized users.

In another preferred embodiment, the web application API makes a call to a browser plug-in. The plug-in enables the browser to automatically install Bluetooth drivers if they are not previously installed (user authorization may be required). Furthermore, the plug-in enables the browser application to communicate with system for wireless authentication 10/11 and to send and receive data to/from it. For example, the application may request user name and/or password from system for wireless authentication 10/11. The application may also request digital keys or any other information.

In another preferred embodiment, system for wireless authentication 10/11 comprises authentication means such as finger print reader, voice synthesizer, iris scanner.

Figure 6:
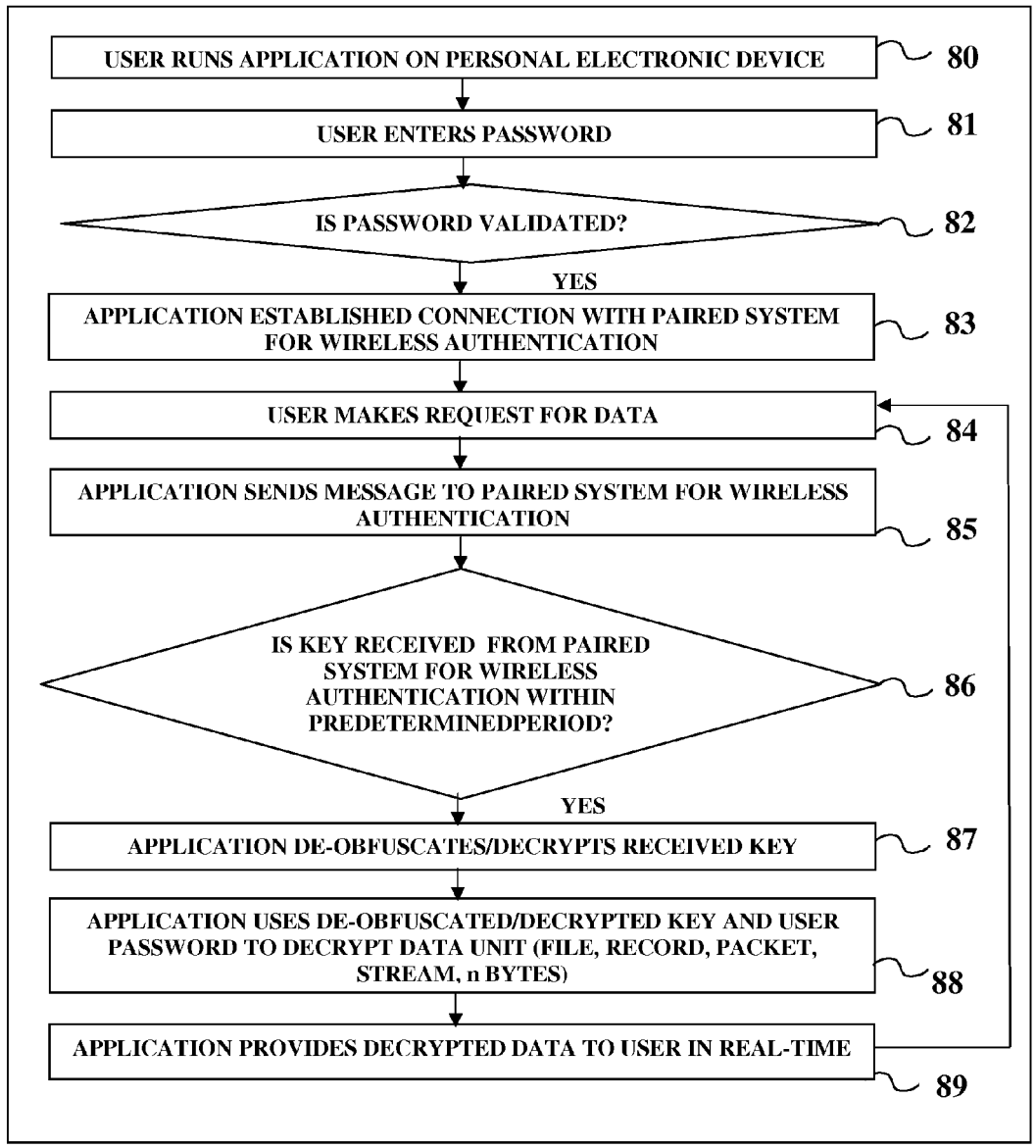
FIG. 6 is a flowchart illustrating an alternative embodiment for providing secure access to encrypted data.

Turning now to FIG. 6, the flowchart illustrates an alternative embodiment for providing secure access to encrypted data.

The user starts an application to access sensitive data in step 80. The user enters a password in step 81 and if validated in step 82, PED establishes a secure BLUETOOTH 2-way wireless connection with system for wireless authentication 10/11 in step 83.

In step 84, on user requesting data, PED sends a message to paired system for wireless authentication 10/11 in step 85.

In a preferred embodiment, system for wireless authentication 10/11 stores a part of a private key. Also, the message sent by PED may contain an obfuscation formula, for example, a large random number and a code for an obfuscation formula.

pK=private key
ppK=part of private key
oppK=obfuscated part of private key stored on mobile device
r=random number generated by PED
f=obfuscation function
cf=code for obfuscation formula generated by PED
l=data sent from PED to system for wireless authentication 10/11
>>l=r, cf (cf) changes every time or periodically. System for wireless authentication 10/11 knows how to interpret (cf) and convert it to a function.

(r) is a random string or number. For example, a 128 byte string or number. Function (f) may be: ADD, DELETE, MULTIPLY, SHIFT ONE BIT THEN ADD, AND, OR, NAND, NOR, APPEND, REVERSE THEN ADD, COMBINE BIT . . . . Function (f) may be applied to (r) and to (oppK) and the result of the function is sent to PED. System for wireless authentication 10/11 must be programmed with the codes (cf) and associated obfuscation/transformation.

PED awaits receipt of key in step 86 in real-time, i.e. within a predetermined period (such as 0.5 second or less than 1 second).
O=data sent from system for wireless authentication 10/11 to PED
>>O=f(r, oppK)

In step 87, PED de-obfuscates or decrypts received key.
f*=reverse of obfuscation function
oppK=f*(O, r)

PED can also de-obfuscate (oppK) to obtain (ppK).

In step 88, PED uses (ppK) as well as information from user password to obtain private key (pK).

The application may extract a second part of private key from pre-known positions of the user password and use the first part and second part to form a private key. (In this case, at initiation of a user password, the user is given some codes that he/she must use as part of a personal password and at specific positions. These codes represent part of the private key. For example, the user is given a choice for the first 5 digits of a password, and is instructed to use 3 specific digits at the end. Another example is the user must use 4 specific digits at the front, and 4-6 own digits next. Another example is the user is given a specific password, etc. . . . ).

In a preferred embodiment, the user is asked for password the first time sensitive data is requested, but after that, authentication is done wirelessly in real-time without requesting information from the user, thus the process is unobtrusive to the user.

In step 89, it uses the private key to decrypt encrypted data and to provide it to the user.

It is important to note that the key is generated in real-time every time encrypted data is requested, and that the key is not stored in memory for a long period (more than the time required for decrypting the data) and is not stored on data storage device.

It is also important to note that decrypted data is not written to data storage device.

If user requests more data, the key is generated again, and more data is decrypted. Furthermore, if the user requests a data volume larger than a predetermined amount, then only predetermined amount is decrypted. Also, if the user requests more data than available RAM memory, then only volume of data that can be kept in available RAM memory is decrypted. This ensures that decrypted data is never stored on data storage device.

PED can also request a digital key from system for wireless authentication 10/11. If a positive response is received, user access to PED is authorized, and if not, user access is denied.

For example, on user activating a mobile phone or a firearm device, the mobile phone will check that system for wireless authentication 10/11 is within proximity. If confirmed, the phone is unlocked and the user does not have to enter a password.

Another example is on user pressing a keyboard key; the computer will check that system for wireless authentication 10/11 is within vicinity. If confirmed, the computer will automatically log the user in and the user does not have to enter a password in the Windows password screen. In this example, the wireless range of system for wireless authentication 10/11 may be reduced to minimum range. A Class 3 BLUETOOTH transceiver may be used or the antenna may be removed so that system for wireless authentication 10/11 has minimum range. If the computer finds more than one authorized user in its vicinity, the computer may ask the user for further authentication or challenge questions.

In another embodiment, a sensitive information application onboard mobile phone for example, checks that system for wireless authentication 10/11 is within proximity. If confirmed, the user is granted access to the application, or data can be decrypted.

In another embodiment, on user trying to access a protected address such as a URL or link, a protected file, an encrypted file, an encrypted record, or a protected database, an application/program running on said paired PED sends a message to said system for wireless authentication 10/11 requesting a digital key. The message may include an address for which a password is sought. Said system for wireless authentication 10/11 automatically sends said digital key. Said digital key may be input in the appropriate fields for authentication or decryption.

This method has the following advantages:

1—Real-time: all the operations can be performed in real-time

2—Simple: uses simple processing and does not require any processor with more than 100 MIPS or more. All operations can be performed by a microcontroller or small power processor 3—Secure channels: channels used a secure using BLUETOOTH security and it is difficult for hackers to copy the data transmitted 4—Time bound: response to a specific operation must be given within a very short time (less than one second) of sending the operation. It would be impossible for a hacker to interpret the transformation method and send a response in the allocated time period 5—The sent message consisting of a very large random number, a very small changing operation code, and a changing transformation method, results in a random result sent from system for wireless authentication 10/11 to PED with no obvious relationship to the sent message. The larger the number of obfuscation/transformation methods, the harder it is to find any relationship between the received message and the generated message 6—The key is not stored on the same physical medium as the data 7—A portion of the key is help on a mobile device, and the other portion is extracted from the user, thus even if the mobile device is cloned without the user knowing, the mobile device cannot be used to access the data directly 8—A periodic check with a remote server is performed to ensure that PED and system for wireless authentication 10/11 have not been stolen together. If a thief steals both PED and system for wireless authentication 10/11, the thief has a limited window of time to decode the second part of the private key. Once the periodic check with remote server is performed, PED will be instructed to self-destroy. Also, in the absence of successful connection, PED will either destroy sensitive data.

a. In a preferred embodiment, system for wireless authentication 10/11 is used to store a part of a private key in a separate location from sensitive data and to supply it to decryption interface in real time when needed to be used as a decryption key. system for wireless authentication 10/11 provides a secure and safe location to store a private key, a part of a private key, or an obfuscated private key/part of a private key in a way that provides far better security and hacker safe system that any other available method.

b. The private key is made completely hacker proof by partitioning it in multiple parts, obfuscating/encrypting a part of the private key and storing it on a mobile device. Furthermore, communication with mobile device is made safe by ensuring close to random data transmission between PED and the mobile device, and close to random data transmission between the mobile device and PED. The correlation factor between the data sent from the PED to the mobile device and the data sent from the mobile device to PED is kept close to a minimum by using the following formulas:

c. When system for wireless authentication 10/11 is paired with PED, it becomes undiscoverable, and will never be able to pair again unless re-flashed through communication center 25. This ensures that system for wireless authentication 10/11 can only be used with one or more PEDs to which it was originally paired and if lost, it cannot be used to access or decrypt data on any other PED. Also, when system for wireless authentication 10/11 is lost, the user/administrator can un-pair PED from a PED console or from a remote console. The lost system for wireless authentication 10/11 will no longer cause any security threat to PED or to other PEDs. Furthermore, information onboard system for wireless authentication 10/11 is obfuscated or encrypted so that a hacker cannot use it. Information onboard of system for wireless authentication 10/11 is a part of private key which is not useful unless it is de-obfuscated, decrypted, and combined with another part of private key extracted from a user password.

d. These methods provide for a very secure data access method, or a data decryption system and method that cannot be breached even when a system for wireless authentication 10/11 device is lost.

In case of unauthorized access, the data will be encrypted and cannot be opened unless in the absence of system for wireless authentication 10/11 which supplies a part of the private key and of the user who supplies a password containing another part of the private key. Furthermore, viruses, Trojan Horses and spywares are ineffective because the data on the storage device or solid state memory is encrypted.

The present invention also secures content onboard the portable electronic device. It presents a comprehensive solution that ensures that content is protected to a maximum level, and cannot be tempered with. This solution involves minimum effort on the part of the user, and ensures minimum risk of exposure in case of a theft of a personal electronic device or a proximity access and/or alarm device occurs.

Public-key infrastructure (PKI) ensures that people are who they say they are and also proves that documents haven't been tampered with.

PKI uses extremely long prime numbers, called keys. In preferred embodiment, keys are 128 bytes long or longer. Two keys are involved—a Private Key, which the owner of the information has access to, and a Public Key, which can be accessed by anyone. The two keys work together, so a message scrambled with the Private Key can only be unscrambled with the Public Key and vice versa. The more digits in these keys, the more secure the process.

A large piece of data set to be encoded—for instance, a document—is run through a complicated mathematical computation to generate a single large number, called a hash. The original data and the hash are inextricably linked. If either changes, the hash won't match. Any entity can verify the validity of the document by checking a stored hash against a hash computed from the data. If the hashes match, the data was not tampered with.

Since the present invention seeks to protect PED as well as data onboard PED, Public Key infrastructure (PKI) is used to generate a set of Public Key and Private Key unique for each user. A proximity access and/or alarm device—system for wireless authentication 10/11 is assigned to each user for storing the Public Key (or alternatively the Private Key), and an application/driver/program/chipset/plug-in/file manager/data base manager containing the Private Key (or alternatively the Public Key) is installed on the user PED.

Sensitive data on PED storage medium (hard drive, solid state memory, Flash, network drive, CD Rom, Zip drive, BLUETOOTH drive) is kept encrypted at all time, using Private Key (or alternatively the Public Key). A hash may be generated and stored every time the data is updated.

On user request to read data, a request is made to system for wireless authentication 10/11 to get the Public Key, and the requested data is decrypted using the key. The requested data is presented through an authorized application. The hash may be generated again and compared with the stored hash key to ensure the data has not been tempered with.

When the user request data, the hash key for the data may be validated against the old hast key to ensure the data has not been tempered with.

Figure 7:
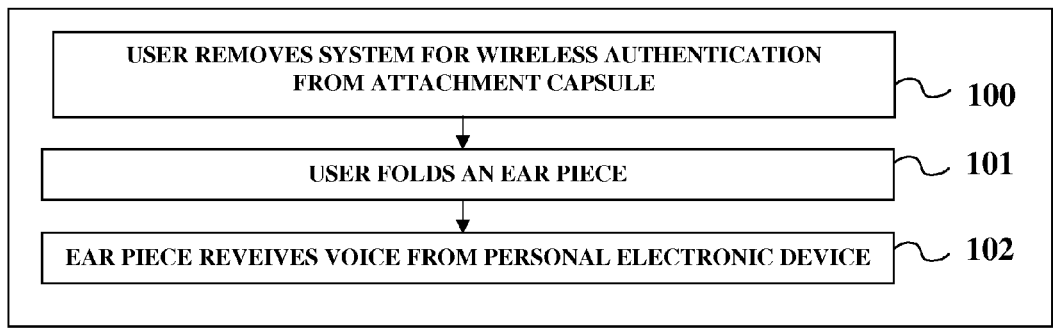
FIG. 7 is a flowchart illustrating using system for wireless authentication as a BLUETOOTH wireless headset.

Turning now to FIG. 7, the flowchart illustrates using system for wireless authentication 10/11 as a BLUETOOTH wireless headset. In step 100, the user removes system for wireless authentication 10/11 from attachment capsule. Attachment capsule can be a ring for attaching to a key chain, a clip, Velcro, an attachment system for attaching to a badge, etc.

In step 101, the user moves a housing comprising the earpiece relative to system for wireless authentication 10/11. The housing can fold up, slide, pull up, slide, twist, detach relative to the main body in order to expose an earpiece that can fit in the ear. In step 102, when the housing containing the earpiece move, the BLUETOOTH wireless headset is activated, and voice can transmit from PED to system for wireless authentication 10/11 speaker or from system for wireless authentication 10/11 microphone to PED.

Cars nowadays offer voice solutions when the user is inside the car, and it would be more interesting for car manufacturers to provide a total solution, regardless of where the user is. Thus system for wireless authentication 10/11 can complement voice service through the car key when the user is outside the car. System for wireless authentication 10/11 is flat when it is not inserted in the ear, and can have the shape of a headset when folded. System for wireless authentication 10/11 can include a metal key to be used in case onboard battery is out of charge.

In another embodiment, system for wireless authentication 10/11 can charge its battery from a vehicle's ignition system, whereby when system for wireless authentication 10/11 is placed in the ignition system, it recharges.

Further, for more security, the user may provide biographic authentication such as be not limited to voice recognition, password entry, retinal scan, finger print, or other information, thus system for wireless authentication 10/11 only function if user is validated.

Since most people carry a wallet, a mobile phone and keys, system for wireless authentication 10/11 provides a user with valuable all in one features and at the same time does not require the user to carry an extra device, all this thanks to BLUETOOTH. The features include:
Proximity alarm for mobile phone
Headset for mobile phone
Locator for parked vehicle
Vehicle keys
Door keys In an alternative embodiment, a GPS system onboard a vehicle sends GPS information to system for wireless authentication 10/11. GPS information is sent on detection of vehicle going into parking position. Alternatively, said GPS information is sent regularly. System for wireless authentication 10/11 over-writes old positions with new GPS position. System for wireless authentication 10/11 stores the GPS information representing the last known position of the vehicle. When the user walks away from the parked vehicle, system for wireless authentication 10/11 will have the last known GPS position of the vehicle stored on it.

When the user wishes to receive instructions on returning to his/her parked vehicle, said user activates an application onboard his/her PED. PED sends a request for information to system for wireless authentication 10/11. System for wireless authentication 10/11 sends GPS information representing the last known vehicle position. System for wireless authentication 10/11 also obtains heading information from an onboard electronic compass and sends heading information.

PED obtains a response from system for wireless authentication 10/11 containing GPS and heading information. PED uses an onboard GPS receiver to obtain new user GPS position information.

It is common knowledge that given 2 GPS positions, the distance between them can be calculated. Also, it is known that given 2 positions (origin and destination), the angle between True North and destination from origin can be calculated.

Therefore, given current heading relative to True North, a vector pointing to destination can be drawn.

PED displays distance from origin to destination. Furthermore, PED displays an arrow pointing toward destination to user. This information helps the user to return to his/her parked vehicle.

Figure 8:
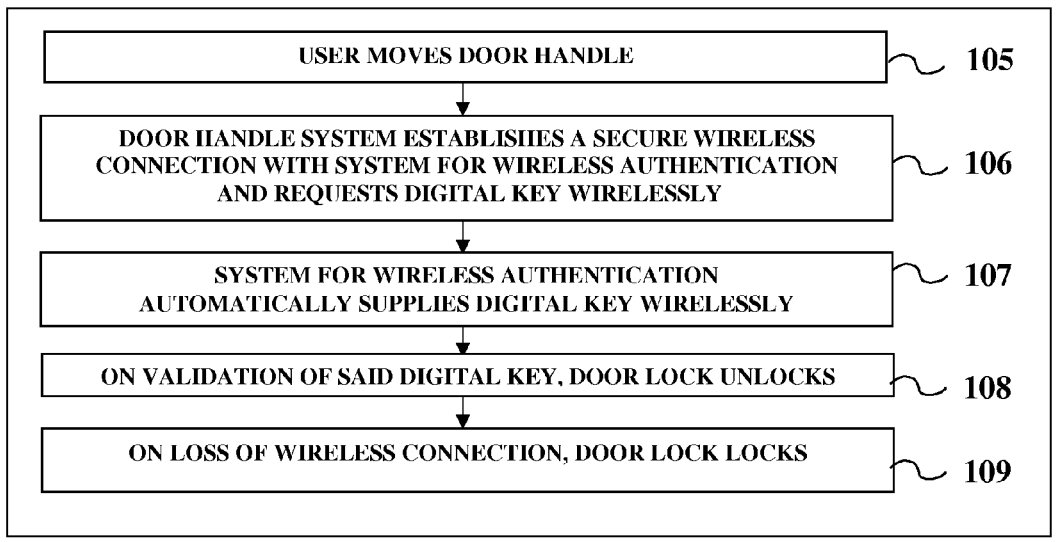
FIG. 8 is a flowchart illustrating an alternative operation of system for wireless authentication.

Turning to FIG. 8, the flowchart illustrates the operation of system for wireless authentication. In step 105, a user tries to access a lock system. A lock system can be an electronic lock that activates a mechanical lock, a software interface that activates a lock screen or a password screen, a software interface that encrypts data, a software interface that blocks user from accessing a personal electronic device, any other locking system. For example, user activates handle of locked door, a user clicks on a locked/encrypted file . . . . In step 106, the lock system establishes a secure two-way wireless connection with system for wireless authentication 10/11 and requests a digital key. The digital key can be a private key/public key/part of a private key/part of a public key, an encoded/encrypted/obfuscated private key/public key/part of a private key/part of a public key. The lock system may send an obfuscation/encrypted formula so that system for wireless authentication 10/11 can obfuscate/encrypt transmitted information, can return it within a predetermined period (for example a second) and so that the lock system may de-obfuscate/de-crypt the returned result. In step 107, System for wireless authentication 10/11 automatically returns digital key wirelessly, and in step 108, on validation of the digital key, the lock system unlocks. In step 109, the lock system may try to maintain a wireless connection with system for wireless authentication 10/11, and on detection of a connection drop, lock.

A user can purchase/acquire/install a lock system that comes with a digital access code (provided on a CD, memory card, USB flash, email, or any way for transferring digital data). The user can later update system for wireless authentication 10/11 with the new digital access code by connecting system for wireless authentication 10/11 to a PED, and transferring the new digital access code to system for wireless authentication 10/11. The new digital code will be stored onboard system for wireless authentication 10/11. The new digital code may be transferred to system for wireless authentication 10/11 through SPI flashing.

In a preferred embodiment, system for wireless authentication 10/11 stores a part of a private key. It receives a message from PED containing an obfuscation formula, for example, a large random number and a code for an obfuscation formula.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:

1. A method for automatically logging a user to a client application, wherein the client application can run on a first device, and the client application is selected from the group consisting of an enterprise application, a mobile application, a client-server application, a web application, a Customer Relationship Management (CRM) application, a mobile payment application, and a Near Field Communication (NFC) payment application, comprising the steps of:
   establishing a two-way secure wireless connection between the first device and a second mobile device, the second mobile device comprising a single wireless transceiver selected from the group consisting of a BLUETOOTH transceiver, and a Wibree transceiver, wherein the second mobile device can pair wirelessly with a compatible apparatus in a first range,
   wherein upon pairing with a compatible apparatus in a first range, the second mobile device switches to a non-discoverable mode,
   wherein the second mobile device can connect to a programming device and can store user data from the programming device in flash memory onboard the second mobile device,
   wherein upon the first device wirelessly receiving user data from the second mobile device, the user data is authenticated by authentication means selected from the group consisting of a Remote Authentication Dial In User Service (RADIUS) server, a client application authentication means, and a remote server authentication means, wherein the user data is selected from the group consisting of a username, a password, a digital key, a public key, a private key, an encryption key, and encrypted user information, and
   upon successful authentication, the user is automatically logged to the client application.

2. The method of claim 1, further comprising the step of displaying a login screen upon an event selected from the group consisting of the two-way secure wireless connection fails, the user data is not received from the second mobile device, and the user data received from said second mobile device fails authentication, and
   wherein upon detection of a connection drop, the user is logged out of the client application, said and the first device and the second mobile device may attempt to reconnect.

3. The method of claim 1, further comprising the step of connecting the second mobile device to a computer and flashing user data to flash memory onboard the second mobile device.

4. The method of claim 1, wherein upon detection of a connection drop from the first device, the second mobile device activates an audible alarm of at least 60 decibels.

5. The method of claim 1, further comprising the step of periodically lighting a logo onboard the first device.

6. The method of claim 1, further comprising the step of the second mobile device storing one or more files in flash memory onboard the second device, the one or more files being selected from the group consisting of a marketing brochure, a coupon, a promotion, an instruction manual, an invitation and a marketing collateral, wherein the second mobile device performs actions selected from the group consisting of upon pairing with the first device, the second mobile device sends the one or more files to the first device, the second mobile device sends one or more files to the first device a predefined time after pairing, the second mobile device accepts one or more files from trusted devices when in proximity to the trusted devices and sends the one or more files to the first device.

7. The method claim 1, further comprising the step of storing at least one set of access parameters corresponding to at least one client application on the second mobile device, wherein upon one client application requesting a set of login parameters, the second mobile device automatically sends the set of corresponding login parameters wirelessly.

8. A unitary apparatus, comprising:
   a flash storage means, an attachment means selected from the group consisting of a key chain, a ring, a bracelet and a clip, a single transceiver selected from the group consisting of a BLUETOOTH transceiver, and a Wibree transceiver,
   wherein said single transceiver can pair with a second apparatus in a first range,
   wherein said single transceiver can establish a secure two-way wireless connection with a paired second apparatus,
   wherein upon pairing with a compatible apparatus in a first range, said single transceiver can switch to a non-discoverable mode,
   wherein said single transceiver can send data wirelessly to said paired second apparatus, an alarm means whereby said alarm means can issue an audible sound of at least 60 decibels,
a data port for connecting to a third device and for flashing user data onboard said flash storage means,
whereby said user data is selected from the group consisting of a user name, a password, a seat position, a steering wheel inclination, a rear view mirror position, a side mirror position, a radio station, an internet station, a game selection, channel information, a security code, an access code, a phone book, a public key, a private key, an encryption key and a decryption key,
wherein said second apparatus is selected from the group consisting of a mobile phone, a Personal Computer (PC) and a Personal Digital Assistant (PDA), wherein a processor onboard said second apparatus can execute a client application, wherein said client application can request user data from said unitary apparatus, upon authentication of said user data, said user can be automatically logged in to said client application, and if said user data is not authenticated a login screen can display on said second apparatus,
wherein said second apparatus further comprises a folding earpiece and a microphone, whereby when folded said apparatus automatically operates as a standard BLUETOOTH headset providing voice functionality.

9. The unitary apparatus of claim 8, not comprising a unitary microcontroller chipset, and not comprising a reset function.

10. The unitary apparatus of claim 8, comprising a motion detector, wherein, upon detection of a connection drop from said unitary apparatus, said user is automatically logged out of said client application.

11. The unitary apparatus of claim 8, further comprising a chipset for enabling the sending and receiving of data to and from an iPhone™ using BLUETOOTH.

12. The unitary apparatus of claim 8, wherein said second apparatus is an electronic system and whereby said electronic system can perform actions selected from the group consisting of:
    upon a user moving a door handle, said electronic system verifies said unitary apparatus is within proximity and unlocks said door,
    upon a user moving a door handle, said electronic system verifies said unitary apparatus is within proximity, establishes a wireless connection and unlocks said door,
    upon detection of a connection drop, said electronic system locks said door,
    upon a user pressing a button, said electronic system verifies that said unitary apparatus is within proximity and starts an engine, and
    upon detection of said unitary apparatus being within proximity said electronic system requests user information, and automatically provides said user information to one or more systems.

13. The unitary apparatus of claim 8, wherein said second apparatus is an automobile electronic system and whereby said automobile electronic system can send a wireless request to said unitary apparatus, and upon receipt of a message comprising user information from said unitary apparatus, said automobile electronic system can perform actions selected from the group consisting of:
    adjust seat position according to user information,
    adjust wheel position according to user information,
    adjust side mirror position according to user information,
    adjust rear view mirror position according to user information,
    set radio station according to user information,
    load phone book according to user information, and
    run games according to user information.

14. The unitary apparatus of claim 8, further comprising a means selected from group consisting of a keypad for entering digits, a Liquid Crystal Display (LCD) for displaying digits, a finger print reader, a voice synthesizer, and an iris scanner.

15. The client application of claim 8, wherein said client application further comprises an application programming interface (API) configured to provide an interface between said unitary apparatus and said client application.

16. The client application of claim 8, wherein said client application is a web application, and said web application makes a call to a browser plug-in configured to provide an interface between said unitary apparatus and said client application.

17. The client application of claim 8, wherein upon receipt of user data from said unitary apparatus, said user data is sent to a Remote Authentication Dial In User Service (RADIUS) server.

* * * * *